(12) United States Patent
Comer

(10) Patent No.: US 7,924,294 B2
(45) Date of Patent: Apr. 12, 2011

(54) POLYGON TRIMMING USING A MODIFIED AZIMUTHAL MAP PROJECTION

(75) Inventor: Robert P. Comer, Concord, MA (US)

(73) Assignee: The MathWorks, Inc., Natick, MA (US)

( * ) Notice: Subject to any disclaimer, the term of this patent is extended or adjusted under 35 U.S.C. 154(b) by 509 days.

(21) Appl. No.: 11/646,045

(22) Filed: Dec. 27, 2006

(65) Prior Publication Data

US 2008/0162038 A1 Jul. 3, 2008

(51) Int. Cl.
*G09G 5/00* (2006.01)
(52) U.S. Cl. ........ 345/620; 345/441; 345/581; 345/619; 345/621
(58) Field of Classification Search .................. 702/5, 1, 702/2, 14, 16; 345/423, 441, 586, 621
See application file for complete search history.

(56) References Cited

U.S. PATENT DOCUMENTS 5,341,463 A * 8/1994 Wescott et al. ............... 345/441
5,488,684 A * 1/1996 Gharachorloo et al. ...... 345/423
5,544,052 A * 8/1996 Fujita et al. ...................... 702/5

OTHER PUBLICATIONS

"Azimuthal Map Projections", http://www.fes.uwaterloo.ca/crs/geog165/azproj.htm, Sep. 15, 2003, pp. 1-4.
Furuti, Carlos A., "Two Aspects for Two Arbitrary Azimuthal Projections", http://www.progonos.com/furuti/mapproj/normal/carthow/how a..., Jan. 14, 2004, pp. 1-4.

* cited by examiner

*Primary Examiner* — Kee M Tung
*Assistant Examiner* — Jwalant Amin
(74) *Attorney, Agent, or Firm* — Cesari and McKenna, LLP; Michael R. Reinemann

(57) ABSTRACT

In one embodiment, a system, method and computer readable media are disclosed for trimming geographic data that defines polygons to boundaries of a quadrangle. The geographic data is converted to map coordinates in a novel azimuthal map projection. Each map projected point in the azimuthal map projection has an azimuthal angle that is proportional to longitude of the point, and has a radius from the center of the azimuthal map projection that is proportional to both the longitude and latitude of the point. Polygons are trimmed along a lower limit of the quadrangle and along an upper longitude limit of the quadrangle using the azimuthal map projection. The map coordinates in the azimuthal map projection are then converted back to geographic data.

33 Claims, 17 Drawing Sheets

POLYGON TRIMMING USING A MODIFIED AZIMUTHAL MAP PROJECTION

BACKGROUND

1. Technical Field

This disclosure relates generally to trimming of polygon data.

2. Background Information

A map is a representation of geographic data, for example data that represents regions or features on a planet's surface, such as the Earth's surface. Geographic data specifies features in relation to geographic measure (i.e. georeferences the features) in 3-dimensional space, for example in relation to latitude (parallels) and longitude (meridians). Latitude is defined formally as the angle between the plane of the equator of a planet and a line normal to an idealized surface connecting a point in question to the planet's rotational axis. Longitude is defined formally as the angle at the center of a planet between two planes that align with, and intersect along, the axis of rotation, perpendicular to the plane of the equator. One plane contains the Prime Meridian and the other contains the point in question.

To display a map on a two-dimensional medium, such as a piece of paper, or a computer screen, it is often desirable to convert geographic coordinates to projected coordinates in a transformation process commonly referred to as map projection. In this manner, a two-dimensional representation is created from three-dimensional data. With all map projections, certain properties of the data are preserved, while other properties may be distorted or approximated to facilitate the projection. Depending on the particular type of map projection employed, area, distance (along certain lines), direction, local shape or other properties may be preserved or distorted. A large number of different map projections are known and used in the art. Many of these projections are classified into three large categories of projections. A first category of map projections is commonly termed cylindrical map projections. Cylindrical map projections are produced by mathematically modeling a cylinder about a sphere having the geographic coordinates laid thereon and projecting these coordinates onto the cylinder's interior surface. The cylinder is then unwrapped to yield a flat map. Cylindrical map projections may be equal-area (i.e. preservative of area of regions), conformal (i.e. preservative of angles between features), equidistant (i.e. preservative of distance along selected curves) or otherwise configured, depending on the techniques used to create the projection.

A second category of map projections is commonly termed conical map projections. Conical map projections are produced by mathematically modeling a cone placed about a sphere having the geographic coordinates laid thereon, and projecting these coordinates onto the cone's interior surface. This surface is then unwrapped. Conical map projections often achieve less distortion at middle and high latitudes than cylindrical map projections, yet trade-off other qualities to achieve this advantage.

A third category of map projections is commonly termed azimuthal map projections. Azimuthal map projections are produced by mathematically modeling a plane tangent or proximate to a sphere having the geographic coordinates laid thereon, and projecting the geographic coordinates onto the plane. When the tangent point is selected as a pole of a planet, the projection is commonly termed a polar azimuthal map projection. In a conventional polar azimuthal map projection, meridians are projected as straight lines radiating from the pole, and parallels are projected as complete circles centered at the pole. Most azimuthal map projections are not suitable for displaying all of a planet in one projection, and accordingly two or more azimuthal map projections are often employed to represent an entire planet.

Sometimes it is desirable to create a map of a specific region, using only certain portions of the geographic data available, rather than all the available geographic data. For example, one may desire a map of a quadrangle of the surface of a planet, i.e. a region bounded by parallels (or possibly a pole) north and south, and meridians east and west. When only a selected quadrangle is to be mapped, geographic data must be "trimmed" at the boundaries of the quadrangle, so as to limit the features mapped to those in the quadrangle. This often presents technical challenges.

Geographic data may be represented in a variety of manners. In many systems, geographic data takes the form of vectors, i.e. arrays with storage locations accessible by reference to an integer offset. Separate vectors may be employed for latitude and longitude data, with corresponding elements from the two vectors representing the coordinates of points. For example, a simple set of vector geographic data may be:

lat=[45.6 −23.47 78];

lon=[13 −97.45 165];

where the coordinates (in degrees latitude and longitude) of three points are provided.

Depending on the context, vector data may describe individual points (for example, referring to the above data, three individual points), line segments (for example, referring the above data, two line segments joined at a point), or vertices of polygons (for example, referring the above data, the three vertices of a triangle).

Polygons are figures having three or more faces (i.e. sides) that form a ring (i.e. a simple closed curve). A set of geographic data may specify a large number of polygons. A polygon that is intended to enclose a region (for example, to enclose a continent or other landmass) is commonly characterized as an outer ring, while a polygon that exists inside of an outer ring, and is intended to exclude an area, i.e. to create a "hole" (for example, to represent a lake or an inland sea) is commonly termed an inner ring. Generally outer rings and inner rings may not intersect, except possibly at a single tangent point.

When geographic data takes the form of polygons, and the geographic data is trimmed at the boundaries of a quadrangle, individual polygons that extend across the boundaries of the quadrangle generally must also be trimmed. That is, the boundaries of the individual polygons must be modified so as to not extend beyond the quadrangle, while still representing a closed figure. Polygon trimming presents various technical challenges which have not been adequately addressed in prior systems.

For example, in many prior systems longitude wrapping proves problematic to polygon trimming and may lead to unacceptable results. Longitude wrapping is a condition that may exist due to longitude "wrapping around the planet," such that the same point, or nearby points, are represented by quite different longitude coordinates, for example by coordinates which vary by multiples of 360° (or 2π radians). While all longitude coordinates may readily be converted to a standard interval, for example so that all longitude coordinates fall in the interval −180° to 180° (or −π to π radians), problemsome discontinuities may be introduced by such conversion, as information descriptive of the polygons may be lost. Prior techniques for trimming polygons to quadrangles have often inadequately and/or inelegantly accounted for such discontinuities, leading to inefficient polygon trimming, and in some systems artifacts and other irregularities in maps generated from trimmed polygon data.

Accordingly, improved techniques are needed.

SUMMARY

In an example embodiment, a system, method, and computer-readable media are provided for trimming geographic data defining one or more polygons to the boundaries of a selected quadrangle. One or more data structures containing geographic data, such as latitude and longitude vectors, which define polygon vertices, are passed to a polygon to quadrangle trimming unit. The polygon to quadrangle trimming unit also receives upper and lower latitude and longitude limits, for example, from a user selection or another source. A decision is made whether the geographic data defining polygons may be trimmed using a single projection centered at a first point, such as the South Pole, or a single projection centered at a second point located 180° ($\pi$ radians) away from the first point, such as the North Pole, or using two projections, one centered at each the first and second point. In one configuration, the decision is based upon a proximity of the upper and lower latitude limits of the quadrangle to the first and second points, respectively.

If the geographic data defining polygons is to be trimmed using a single projection centered at either a first or a second point, a similar sequence of steps is employed. In both sequences, the geographic data defining polygons is trimmed to a first latitude limit, using a trimming technique, such as a trimming technique that involves rotation of the geographic data so that all trimming takes place along a vertical line. Subsequent to this trimming, the geographic data defining polygons is transformed into map coordinates in a Modified Azimuthal map projection, in which projected points have a radius from the center of the map projection that is proportional to the point's latitude and longitude. In one embodiment, the Modified Azimuthal map projection defines map coordinates in terms of sine and cosine functions of longitude. The effects of longitude wrapping are thus avoided by conversion to the Modified Azimuthal map projection.

After conversion, the polygons now defined with map coordinates are trimmed to first and second longitude limits, for example by rotation to a vertical orientation and application of a polygon trimming function adapted to trim polygons to vertical lines. Subsequently, the map coordinates are converted from the Modified Azimuthal map projection back into geographic data, such as latitude and longitude vectors. The geographic data is then trimmed to the second latitude limit, for example by a trimming technique that involves rotation of the geographic data so that all trimming takes place along a vertical line. Finally, the geographic data may be displayed, stored or otherwise manipulated as desired.

If the geographic data defining polygons is to be trimmed using two projections, one centered at a first point and a second centered at a second point, the geographic data is segmented into a portion proximate to the first point and a portion proximate to the second point. For example, if the points are the North and South Poles, the geographic data may be segmented along the equator. Each portion of the geographic data defining polygons is then trimmed to the boundaries of the quadrangle that extend into that portion. The two portions of the geographic data may be joined back together to form a final set of geographic data, which in turn may be displayed, stored or otherwise manipulated as desired.

BRIEF DESCRIPTION OF THE DRAWINGS

The description below refers to the accompanying drawings, of which.

DETAILED DESCRIPTION OF ILLUSTRATIVE EMBODIMENTS

Figure 1A:
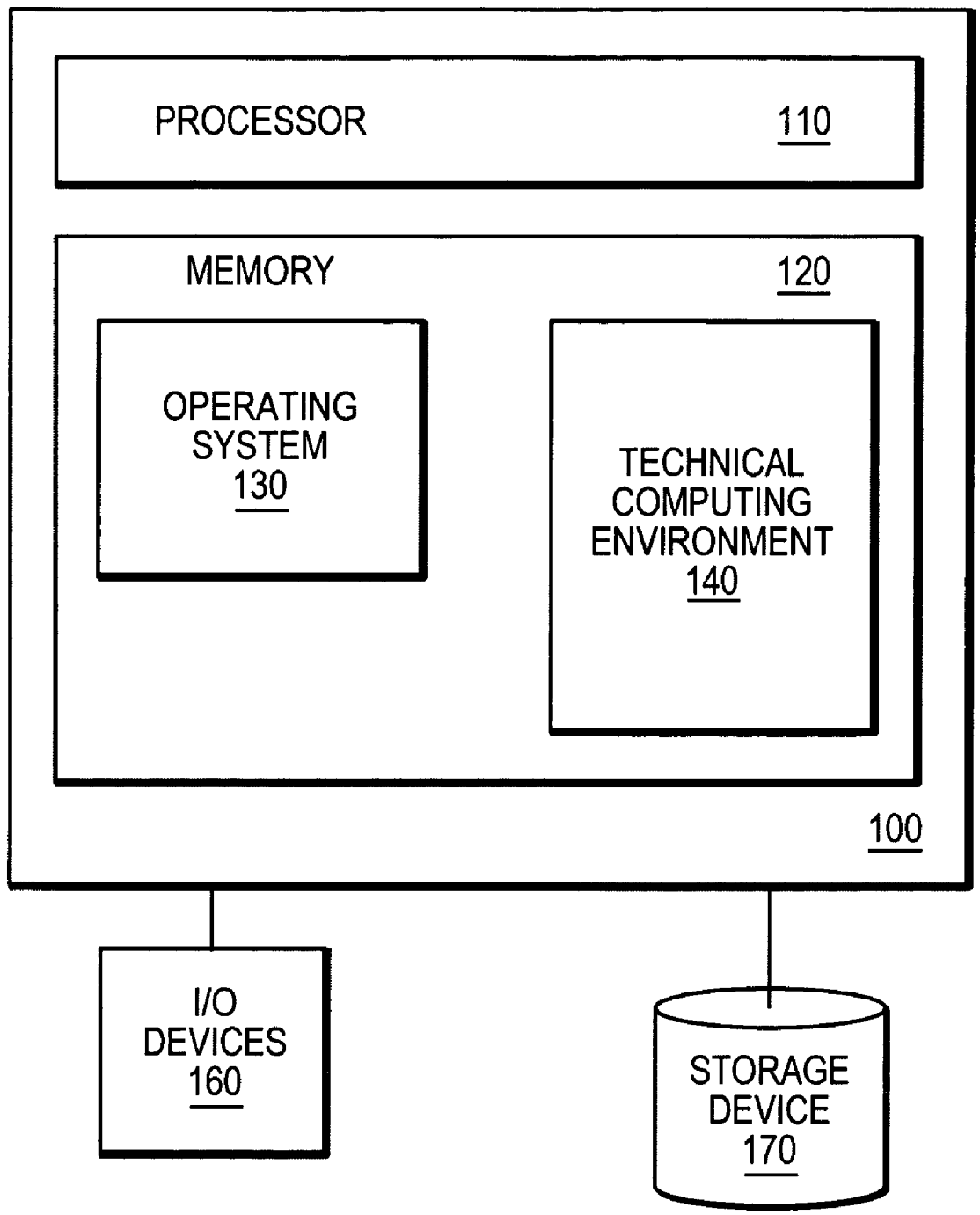
FIG. 1A is a block diagram of an example computer system in which the polygon trimming techniques described herein may be employed.

FIG. 1A is a block diagram of an example computer system 100 in which the polygon trimming techniques described herein may be employed. The computer system 100 includes a processor 110, such as a central processing unit (CPU), one or more storage devices 170 for storing computer-executable instructions, such as hard disks or compact disk (CD) drives, as well as one or more input/output (I/O) devices 160, such as keyboards, mice, network connections or monitors. The computer system 100 further includes a memory, for example a Random Access Memory (RAM) that, at least when the computer system is operating, may store computer-executable instructions. For example the memory may store instructions that implements an operating system 180, such as the Windows™ operating system available from Microsoft Corp., the OSX™ operating system available from Apple Computer Corp., or the Linux™ operating system available from a variety of vendors, including Red Hat Corp. of Raleigh, N.C., as well as instructions that implements a technical computing environment 140. In one embodiment the technical computing environment 140, is the MATLAB® technical computing environment available from The Mathworks, Inc. of Natick, Mass. Yet, it should be remembered that the teachings described herein may alternately be employed with a variety other well-known computing environments, stand-alone applications, programming languages, and/or hardware devices, and accordingly they should in not be interpreted as limited to use only with the MATLAB® technical computing environment.

Figure 1B:
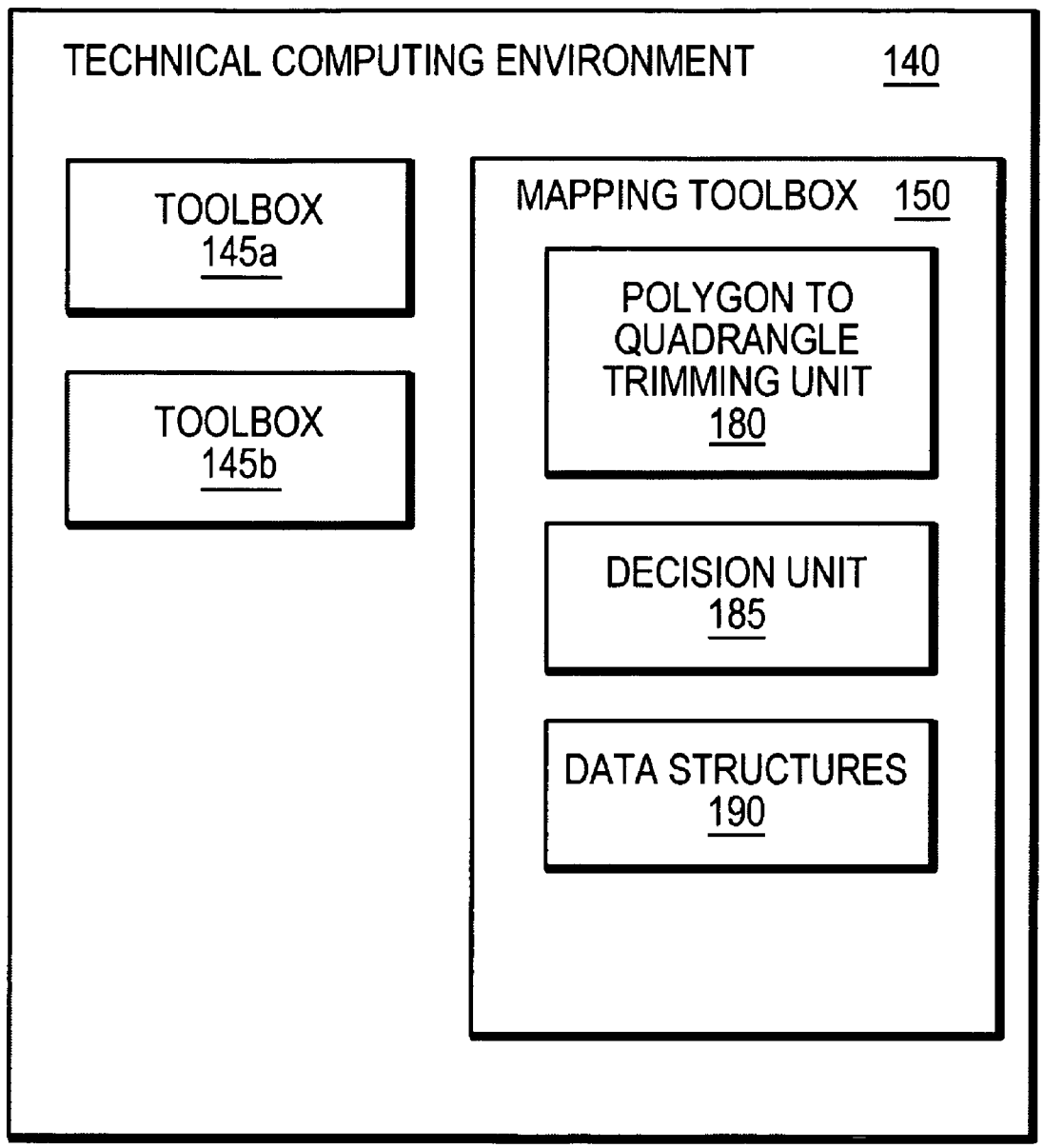
FIG. 1B is a block diagram of an example technical computing environment in which the polygon trimming techniques described herein may be employed.

FIG. 1B is a block diagram of the example technical computing environment 140 in which the polygon trimming techniques described herein may be employed. The technical computing environment 140 may include a plurality of toolboxes 145a, 145b, i.e. packages of functions, tools, and/or other structures that provide additional capabilities beyond the base-level capabilities of the technical computing environment 140. For example, toolboxes 145a, 145b may provide statistics, data analysis, signal processing, communication, image processing or other types of add-on capabilities. In particular, a mapping toolbox 150 may provide functions, tools, and/or other structures useful for transforming, manipulating, displaying and otherwise working with geographic data, maps and similar objects. As explained in detail further below, the mapping toolbox 150 may include a polygon to quadrangle trimming unit 180 that is configured to trim geographic data defining polygons to the boundaries of a selected quadrangle. The quadrangle trimming unit 180 may operate in association with a decision unit 185 adapted to determine a type of trimming that should be employed. One or more data structures 190 may store geographic data defining polygons, latitude and longitude limits, map coordinate data, and/or other data used with the below described techniques.

Figure 2A:
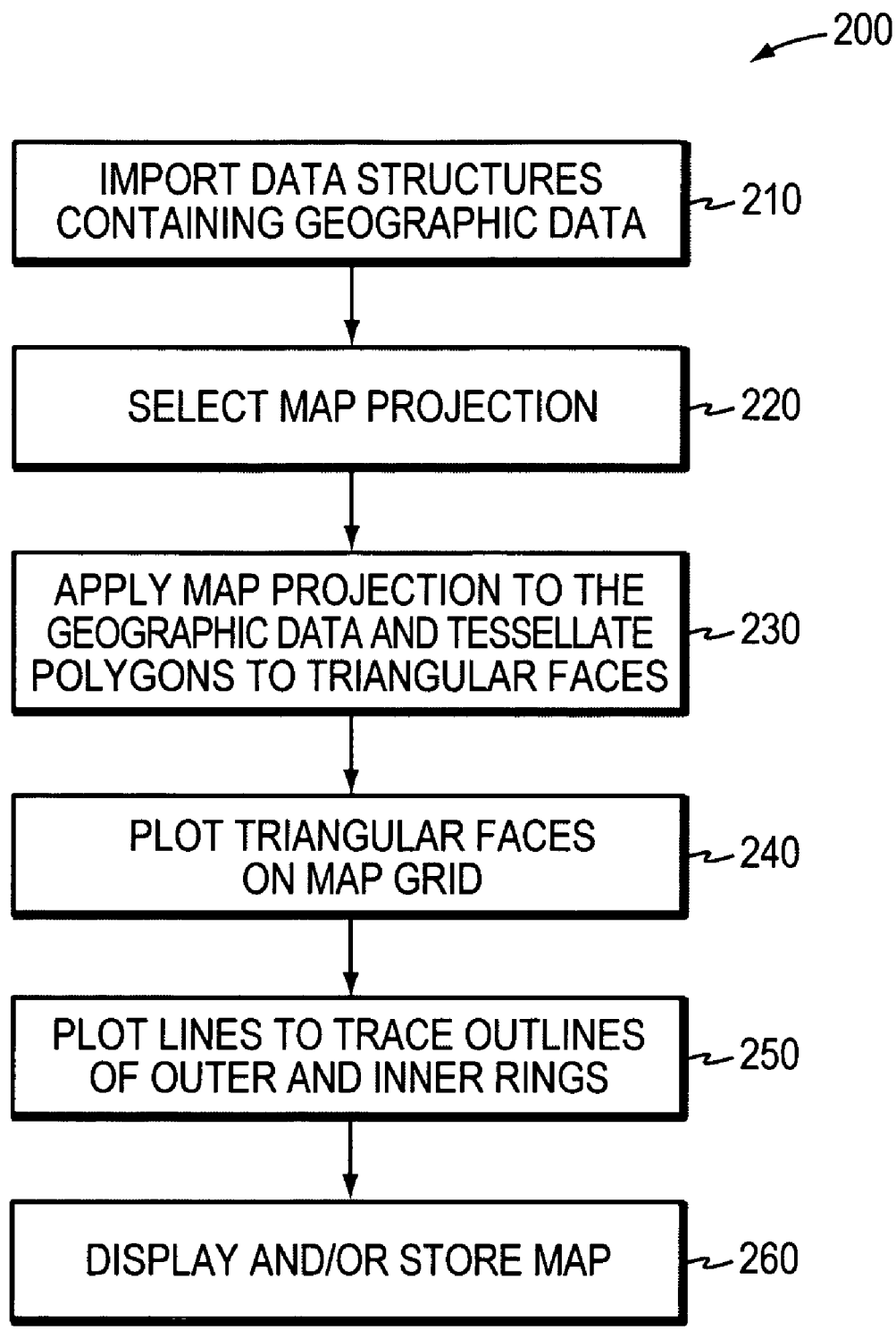
FIG. 2A is a flow diagram illustrating an example sequence of steps that may be performed by functionality of a mapping toolbox to create a map from geographic data.
Figure 2B:
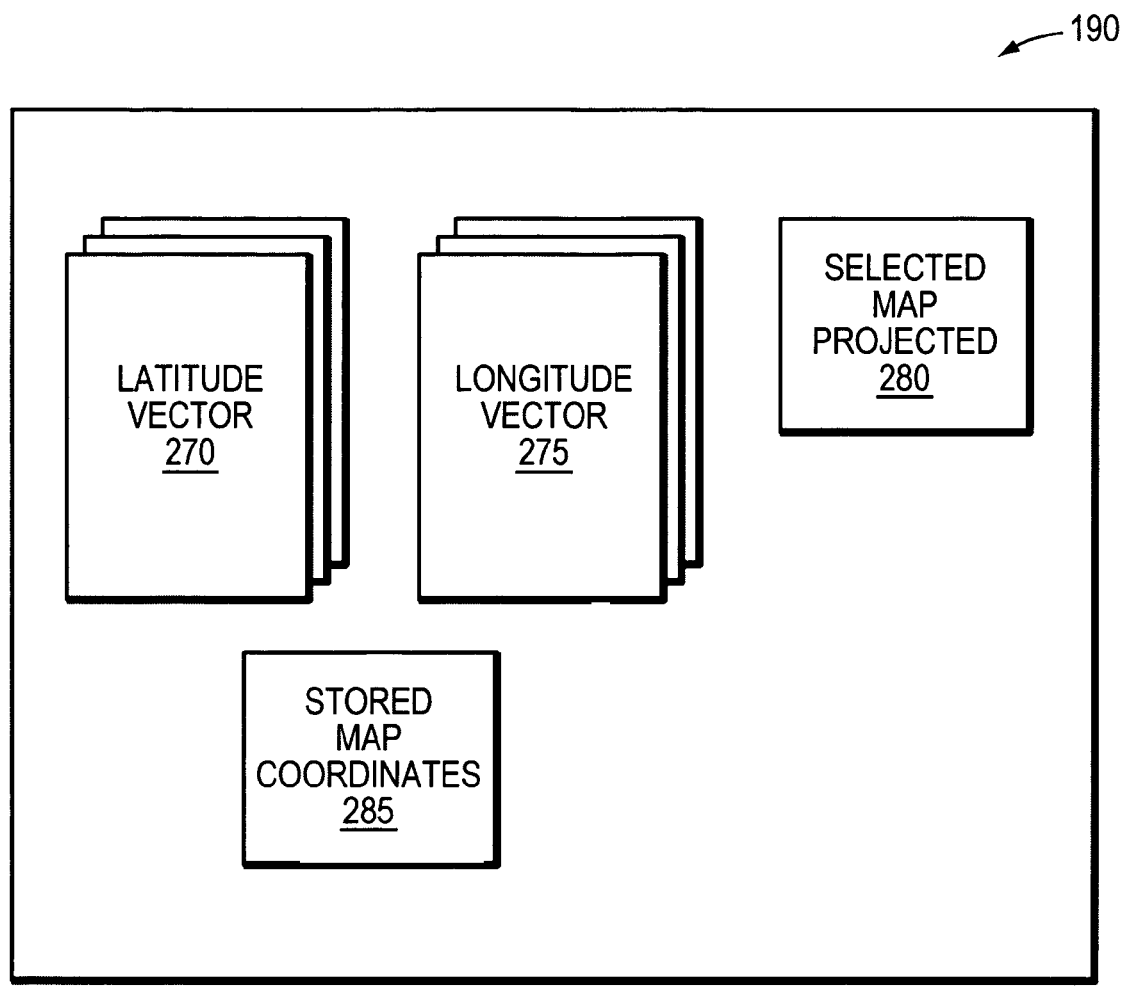
FIG. 2B is a block diagram of data structures that may be used with the steps of FIG. 2A.

FIG. 2A is a flow diagram illustrating an example sequence of steps 200 that may be performed by functionality of the mapping toolbox 150 to create a map from geographic data. In step 210, one or more data structures 190 containing geographic data are imported. An example of such data structures is illustrated in FIG. 2B. In one configuration, the data structures 190 include latitude vectors 270 and longitude vectors 275, which collectively define vertices of polygons. However, in other configurations, the geographic data structures may be linked-lists, matrices, trees, or other well-known types of data structures adapted otherwise employed to store geographic data.

Considering a configuration where the data structures are latitude and longitude vectors 270, 275, multiple polygons may be defined in the vectors by enumerating polygon vertices and separating the vertices of each polygon with a known breakpoint character, string, or other indicator. For example, the value "NaN" (Not a Number) may be used to separate polygons. The hypothetical latitude and longitude vectors "lat" and "lon," shown below, illustrate the definition of two polygons:

lat=[45.6 −23.47 78 NaN 43.9 −67.14 90 −89]

lon=[12 −97.45 165 NaN 0 −114.2 −18 0]

While the definition of polygon vertices is sufficient to identify the boundaries of a polygon, additional information is generally required to determine the nature of the polygon. For example, absent some further indication, it is ambiguous whether a polygon represents a continent, a body of water, or some other type of geographic feature. Such ambiguity may be addressed in a variety of manners. For example, additional data elements may be included in the latitude and longitude vectors 270, 275 to specify feature types. Alternately, to obviate the need to store additional data elements in the vectors 270, 275, the vectors may be encoded and later interpreted according to a defined directionality convention. For example, a directionality convention may treat outer rings, i.e. rings that represent landmasses, differently from inner rings, i.e. rings that represent inland seas or lakes. Outer rings may be encoded to have vertices listed in a clockwise manner about the center of the ring, while inner rings may be encoded to have vertices listed in a counter-clockwise manner about the center of the ring. These encoding may be later recognized through detection techniques. Alternately, the directionality convention may treat clockwise listed vertices as inner rings and counter-clockwise listed vertices as outer rings.

At step 220, a selected type of map projection 280 is accessed for use in creation of a map of the geographic data. The selection may be explicit, for example, by a user or an executing program providing an appropriate command or parameter, or automatic, for example, a default selection in the absence of an explicit selection.

At step 230, the map projection is applied to the geographic data. Polygons are tessellated into a set of triangular faces according to the above described directionality convention. All triangular faces are enclosed by an outer ring, and within each inner ring there is an area devoid of faces. At step 240, the triangular faces are plotted on a map grid. In some configurations, both the edges and interiors of the triangular faces are filled with a color to represent landmasses. At step 250, lines are plotted to trace the outlines of the outer and inner rings. In some configurations, these lines are shown in a color different from that of the triangular faces, to better delineate the boundaries of landmasses and bodies of water. Finally, at step 260, the completed map is displayed to the user, and/or stored in a map coordinate data structure 285 for later display or manipulation.

Figure 3:
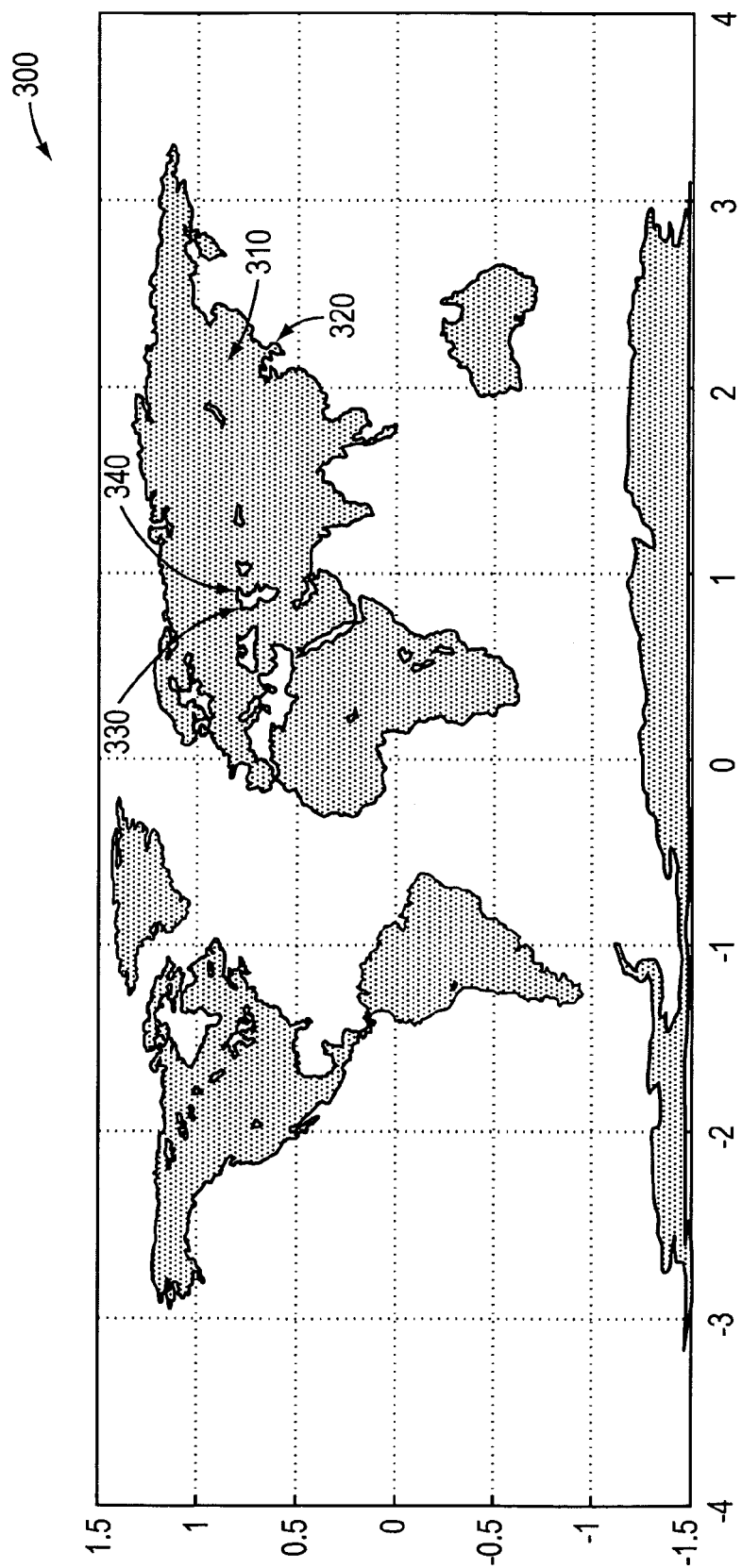
FIG. 3 is an example map of the Earth created by application of the sequence of steps of FIG. 2 to geographic data that defines polygons.

FIG. 3 is an example map of the Earth created by application of the sequence of steps of FIG. 2 to geographic data that defines polygons. The map 300 depicts the various landmasses of Earth, for example, the Eurasian landmass 310, whose sea boundaries are delineated by outer rings, for example, the outer ring 320 of the Eurasian landmass. Inland seas and lakes and other bodies of water, for example, the Caspian Sea 330, have boundaries delineated by inner rings, for example, the inner ring 340 for the Caspian Sea. For purposes of illustration, the example map shown in FIG. 3, and the geographic data used to create the map, will be referred to repeatedly below, to illustrate polygon trimming techniques involving a Modified Azimuthal map projection. It should be remembered that the polygon trimming techniques described herein are in no way limited to use with this particular example map 300, or this map's underlying geographic data defining polygons, and discussion of this map and data are merely to provide visual illustration of the techniques discussed.

Polygon Trimming

Figure 4A:
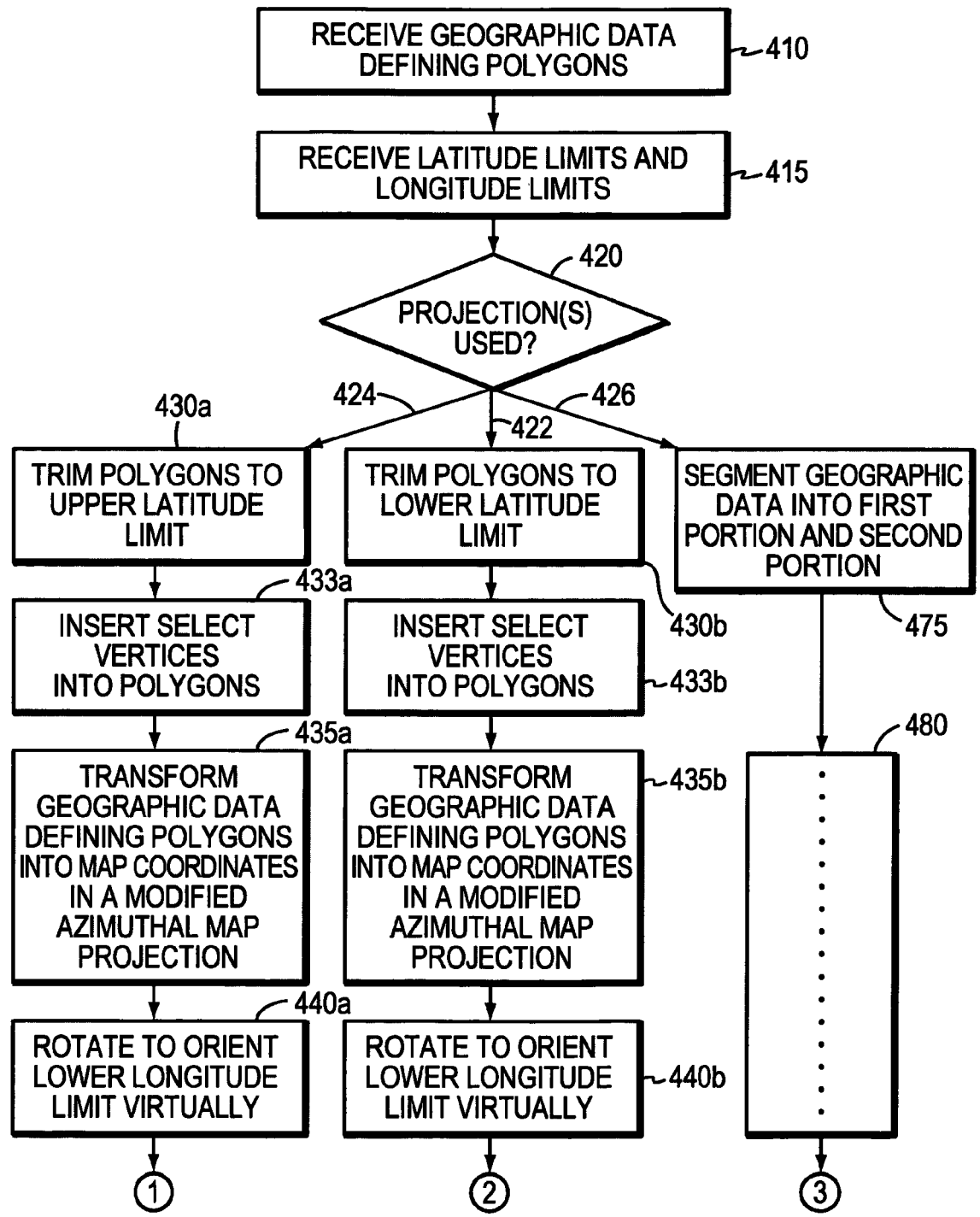
FIG. 4A and FIG. 4B collectively illustrate an example sequence of steps for trimming geographic data defining polygons to the boundaries of a particular quadrangle.
Figure 4B:
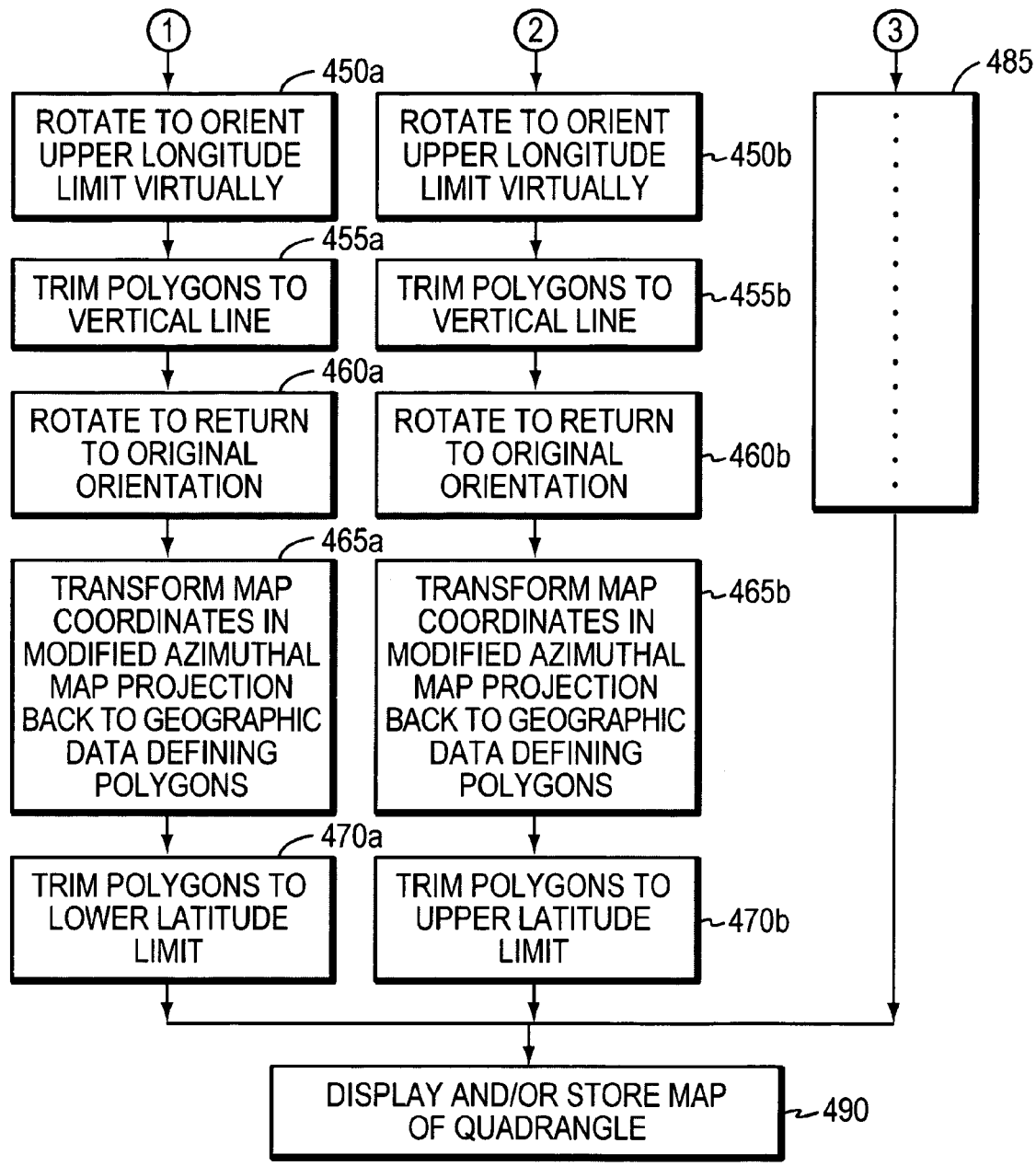

It is often desirable to trim geographic data defining polygons to the boundaries of a particular quadrangle, to display only a map of the quadrangle, or for some other purpose. FIG. 4A and FIG. 4B collectively illustrate an example sequence of steps 400 for trimming geographic data defining polygons to the boundaries of a particular quadrangle. At step 410, geographic data defining polygons, for example, latitude and longitude vectors 270, 275 as discussed above, are received at a polygon to quadrangle trimming unit 180. While the polygon to quadrangle trimming unit 180 is discussed in some embodiments as possibly part of a Mapping Toolbox 150 of a technical computing environment, one should remembered that depending on the particular implementation, the polygon to quadrangle unit may be a standalone function, an executable program, or even a programmable logic device (PLD) configured to execute the sequence of steps described below. At step 415, latitude limits and longitude limits, which together specify the boundaries of the quadrangle, are received at the polygon to quadrangle trimming unit 180. Such limits may take the form of two-element vectors, with the first element specifying an upper limit and a second element specifying a lower limit.

At step 420, a decision is made whether the geographic data defining polygons should be trimmed using a single projection centered at a first point, such as the North Pole (path 422), a single projection centered at a second point located 180° ($\pi$ radians) away from the first point, such as the South Pole (path 424), or using two projections, one centered at the first point (e.g. the North Pole) and one centered at the second point (e.g. the South Pole) (path 426). Such a decision may be made by a decision unit 185 associated with the polygon to quadrangle trimming unit 180. Using differently centered projections improves the quality of the polygon trimming, minimizing the effects of distortion at extreme latitudes. While the choice of projection (i.e. the path chosen) may be made in a variety of manners, in one configuration, the choice is based upon a proximity of the upper and lower latitude limits of the quadrangle to the North and South Poles respectively. That is, if the upper latitude limit is within a threshold distance from the North Pole, and the lower latitude limit is not within a threshold distance from the South Pole, then a projection centered at the North Pole (path 422) is employed. If the lower latitude limit is within a threshold distance from the South Pole, and the upper latitude limit is not within a threshold distance from the North Pole, then a projection centered at the South Pole (path 424) is employed. Finally, if both the upper and lower latitude limits are within a threshold distance of the North and South Poles respectively, then two projections, one centered at each pole are employed (path 426). In one embodiment, the threshold distance is selected to be 10° ($\pi$/18 radians), yet other values are expressly contemplated.

For purposes of brevity, the below descriptions will focus mainly upon polygon trimming using a projection centered at the South Pole (path 424), with the other paths (paths 422 and 426) discussed more briefly, focusing primarily upon their differences from path 424.

Polygon Trimming Using a Map Projection Centered at the South Pole

Figure 5:
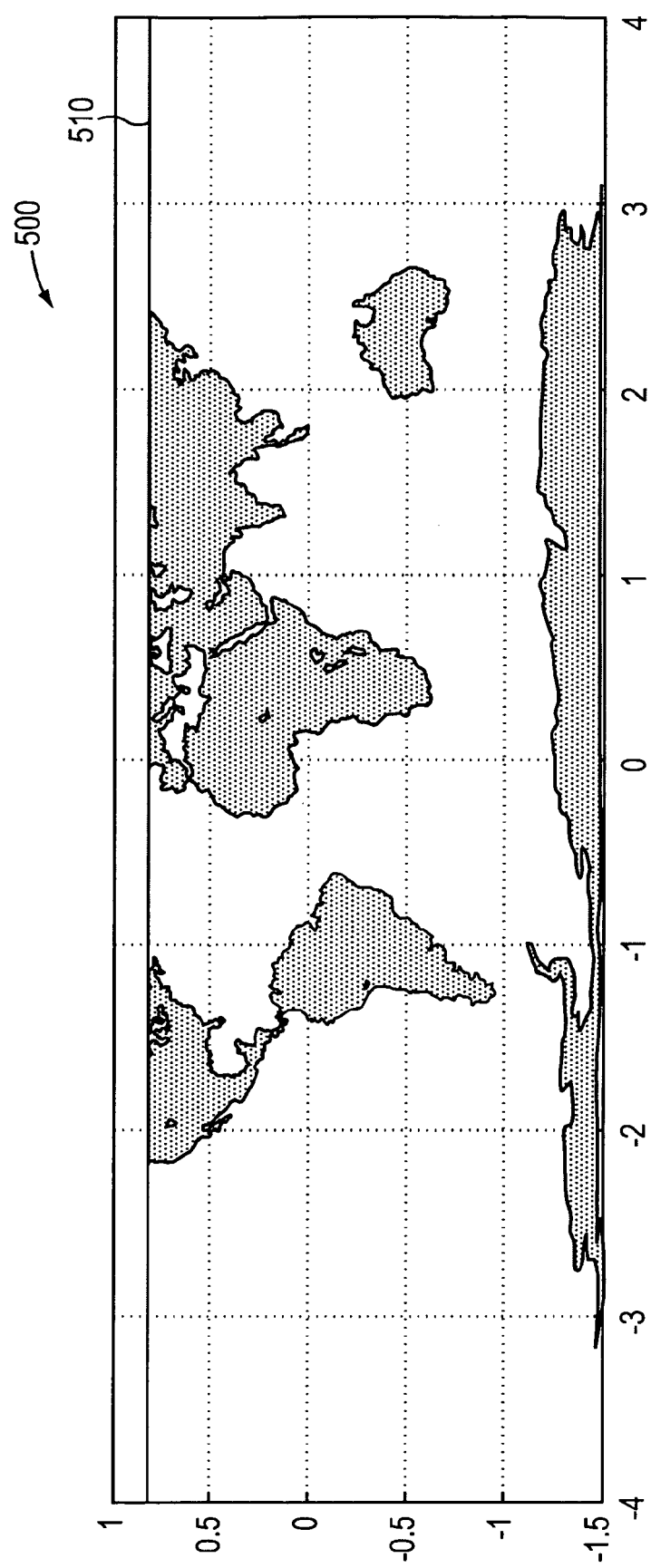
FIG. 5 illustrates the example map of FIG. 3 trimmed to the upper latitude limit by application of a polygon trimming technique.

Following path 424, at step 430a the polygons in the geographic data are trimmed to the upper latitude limit. Such trimming may be accomplished using a polygon trimming technique that involves rotation of the geographic data so that all trimming takes place along a vertical line. That is, by employing rotation functions on the geographic data, the need for different trimming functions to trim polygons along vertical lines (for example, meridians) and horizontal lines (for example, parallels) is obviated, and a single trimming function may be employed. Use of a single trimming function improves code economy, simplifies debugging, and has other benefits. Subsequent to trimming along a vertical line, the geographic data may be rotated back to its original orientation, and execution may proceed. To illustrate the result of latitude trimming, suppose, for example, the upper latitude limit of the quadrangle is selected to be 45° North. FIG. 5 depicts a trimmed version 500 of the example map 300 of FIG. 3, trimmed to the upper latitude limit 510 by application of a polygon trimming technique.

At step 433a, select vertices are inserted into the faces of polygons that span certain precisely-known quadrant boundaries. These boundaries occur at 135° West (3$\pi$/4 radians West) longitude, 45° West ($\pi$/4 radians West) longitude, 45° East ($\pi$/4 radians East) longitude, and 135° East (3$\pi$/4 radians East) longitude. Further detail regarding these vertices, and their use, is provided further below.

At step 435a, the geographic data defining polygons is transformed into map coordinates in a novel Modified Azimuthal map projection. For example, latitude and longitude values of polygon vertices are converted into x and y map coordinates, in relation to an x-axis and a y-axis of a Modified Azimuthal map projection. A Modified Azimuthal map projection resembles a conventional equidistant azimuthal map projection in that it has a center (i.e. a point with map coordinates (0,0)) at a certain point, such as a pole, and has projected points whose azimuthal angle (i.e. an angle about the center with respect to a defined starting line, such as the Prime Meridian) is proportional to their longitude. Yet, unlike conventional equidistant azimuthal projections, projected points in a Modified Azimuthal map projection have a radius from the center of the projection that is proportional to both the point's corresponding longitude and latitude. In a Modified Azimuthal map projection, this proportionality is defined in a particular manner, so that parallels are displayed as squares, rather than as non-linear shapes (e.g. circles), as is common in conventional equidistant azimuthal map projections. While making the radius of projected points proportional to both longitude and latitude renders the Modified Azimuthal map projection non-equidistant, it more readily facilitates polygon trimming as described below.

When a polygon is trimmed to a latitude limit, a linear face is created along the latitude limit. For large polygons, these faces can be very long, spanning many degrees or even whole quadrants of longitude. These long straight faces must be handled carefully to avoid a polygon becoming self-intersecting, violating its topological integrity and corrupting subsequent trimming operations. If one attempted to project these long straight faces in a conventional equidistant azimuthal map projection, where they would be represented as curves, e.g. portions of circles, one would likely have to interpolate the faces into a large number of vertices at different longitudes to adequately approximate the continuously changing direction of the curve. The number of vertices required for an acceptable approximation would undesirably depend upon the detail and spatial sampling density of the polygons being trimmed.

A Modified Azimuthal map projection addresses this issue. The properties of a Modified Azimuthal map projection cause parallels to be represented as squares. Thus any long faces with constant latitude are represented as a series of one or more linear segments, that intersect and change direction from one another only at precisely-known quadrant boundaries, that occur at 135° West (3$\pi$/4 radians West) longitude, 45° West ($\pi$/4 radians West) longitude, 45° East ($\pi$/4 radians East) longitude, and 135° East (3$\pi$/4 radians East) longitude. As described above, vertices may be inserted at the quadrant boundaries to account for longitude trimming. Where faces are sufficiently bounded within a single quadrant no additional vertices may be needed, as described further below.

Looking to the details of conversion, geographic data may be converted into map coordinates in a Modified Azimuthal map projection using the below shown example transformation expressions. Such expressions assume the geographic data is in the form of latitude and longitude vectors 270, 275 in radian measure, yet with minor modification, the expressions may operate on other data formats. The transformation expressions provide:

$$r=(lat+pi/2)/scalefactor(lon);$$

$$x=r*\sin(-lon);$$

$$y=r*\cos(lon);$$

where "lat" and "lon" are latitude and longitude vectors storing polygon data, and "scalefactor(lon)" is an adjustment factor based upon longitude, which varies between values of 1 and $\sqrt{2}$ and is described in more detail below in reference to FIG. 6, "x" and "y" are vectors storing x-axis and y-axis values of map coordinates of polygon vertices in the Modified Azimuthal map projection, "pi" is an approximation of the mathematical constant pi, and the mathematical operators, such as "/", "*", "+" and "−", are applied element-by-element to the vectors. In some implementations, certain adjustments to the above expressions may be made to take into account rounding of constants. For example, the above expression may be supplemented by other expressions that specially define values in the x and y vectors where sine and cosine should ideally evaluate to exactly zero, but may not due to rounding of pi. Specifically, expressions may provide that:

$$\text{if } lon==pi, \text{ then } x(lon)=0;$$

$$\text{if } lon==-pi, \text{ then } x(lon)=0;$$

where "==" is a conditional operator that evaluates to true if the quantities are equal.

Of note, the x and y vectors in the Modified Azimuthal map projection are calculated in part from sine and cosine functions of longitude. Use of such sine and cosine functions obviates many of the issues commonly introduced by wrapping of longitude values. That is, since sine and cosine functions return the same values regardless of addition or subtraction of multiples of 360° (2π radians), longitude values present due to longitude wrapping do not "survive" conversion to a Modified Azimuthal map projection. In this manner, many of the technical challenges presented due to longitude wrapping are avoided.

Figure 6:
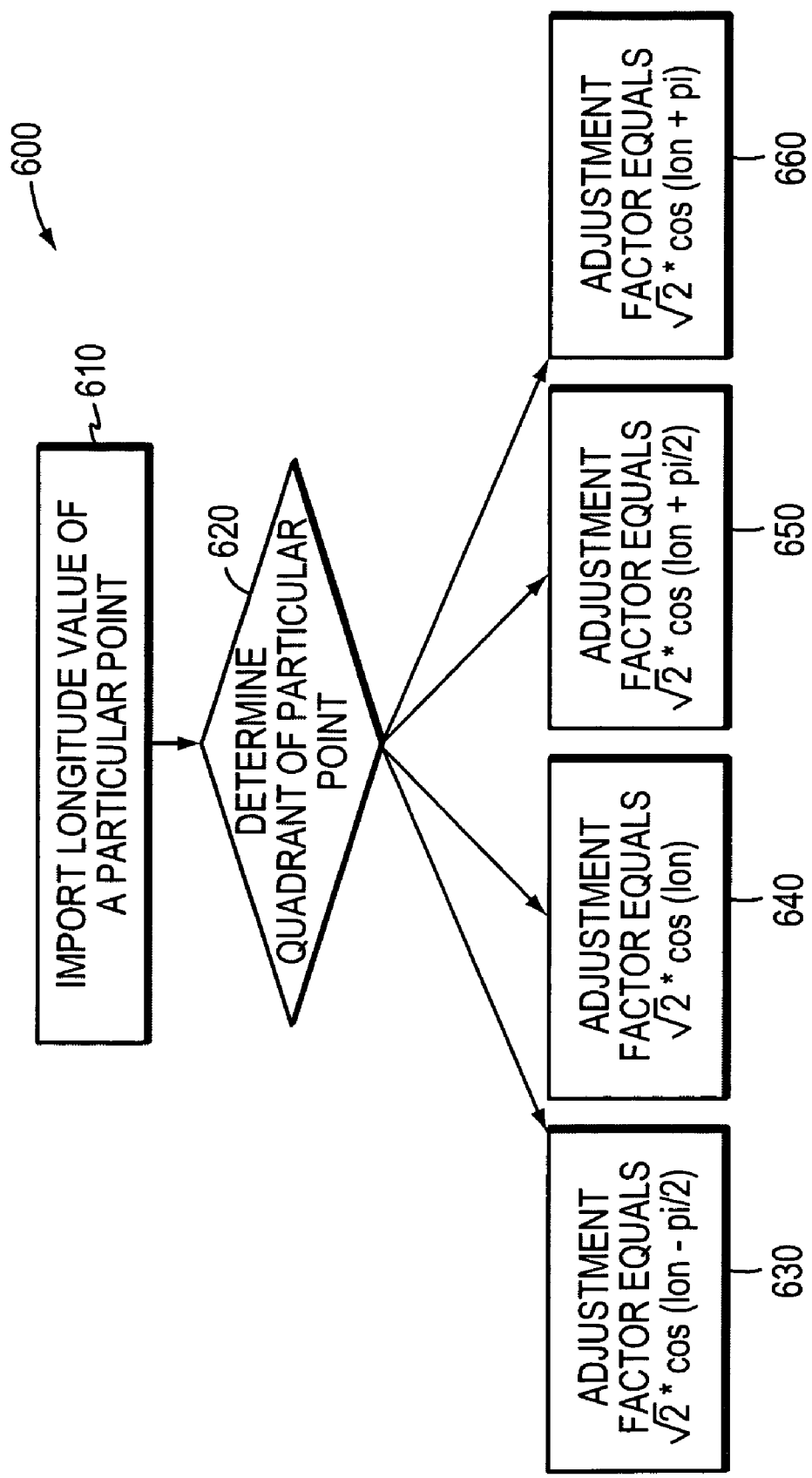
FIG. 6 illustrates an example sequence of steps for determining an adjustment factor based upon longitude used in conversion to a Modified Azimuthal map projection.

FIG. 6 illustrates an example sequence of steps 600 for determining an adjustment factor based upon longitude (i.e. the adjustment factor "scalefactor(lon)") used in conversion to a Modified Azimuthal map projection. At step 610, the longitude value of a particular point is imported. At step 620, the longitude value is examined, and a determination is made as to which of the above described quadrants the value falls in. A first quadrant is defined to extend from 45° East (π/4 radians East) to 135° East (3π/4 radians East), the second from 45° West (π/4 radians West) to 45° East (π/4 radians East), the third from 135° West (3π/4 radians West), to 45° West (π/4 radians West), and the forth from 135° East (3π/4 radians East) to 135° West (3π/4 radians West).

At step 630, if the longitude value falls within the first quadrant, an adjustment factor equal to $\sqrt{2}*\cos(lon-pi/2)$ is returned where "lon" represents the longitude value. At step 640, if the longitude value falls within the second quadrant, an adjustment factor value equal to $\sqrt{2}*\cos(lon)$ is returned. At step 650, if the longitude value falls within the third quadrant, an adjustment factor equal to $\sqrt{2}*\cos(lon+pi/2)$ is returned. Finally, at step 660, if the longitude value falls within the forth quadrant, an adjustment factor value equal to $\sqrt{2}*\cos(lon+pi)$ is returned.

Figure 7:
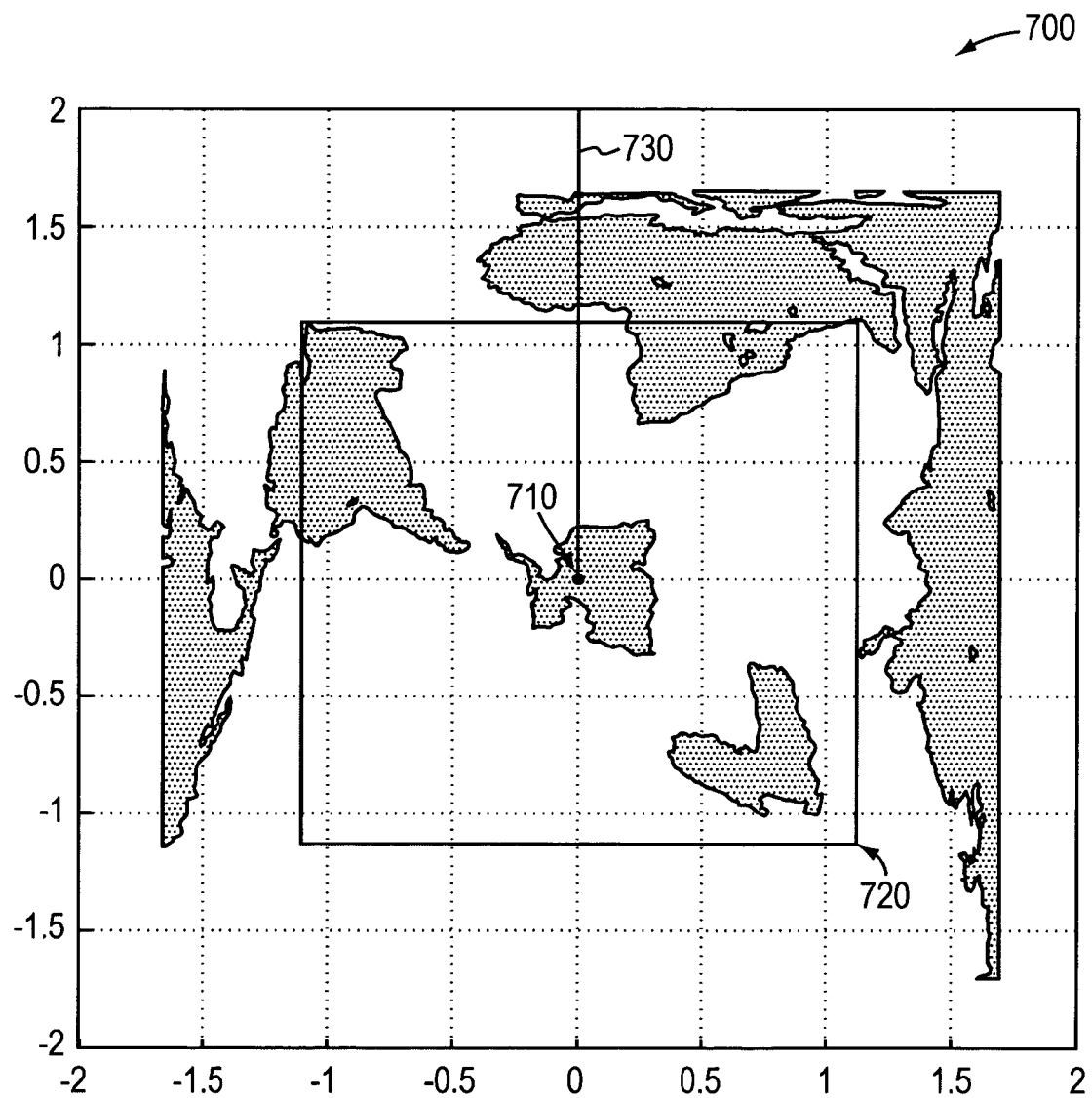
FIG. 7 is an example Modified Azimuthal map projection of the geographic data underlying the map in FIG. 3 and having a center at the South Pole.

FIG. 7 is an example Modified Azimuthal map projection 700 of the geographic data underlying the map in FIG. 3 and having a center at the South Pole 710. As described above, parallels, for example the Equator 720, are depicted as squares in the Modified Azimuthal map projection. Meridians, such as the Prime Meridian 730, are represented as lines that radiate from the South Pole at particular azimuthal angles.

Figure 8:
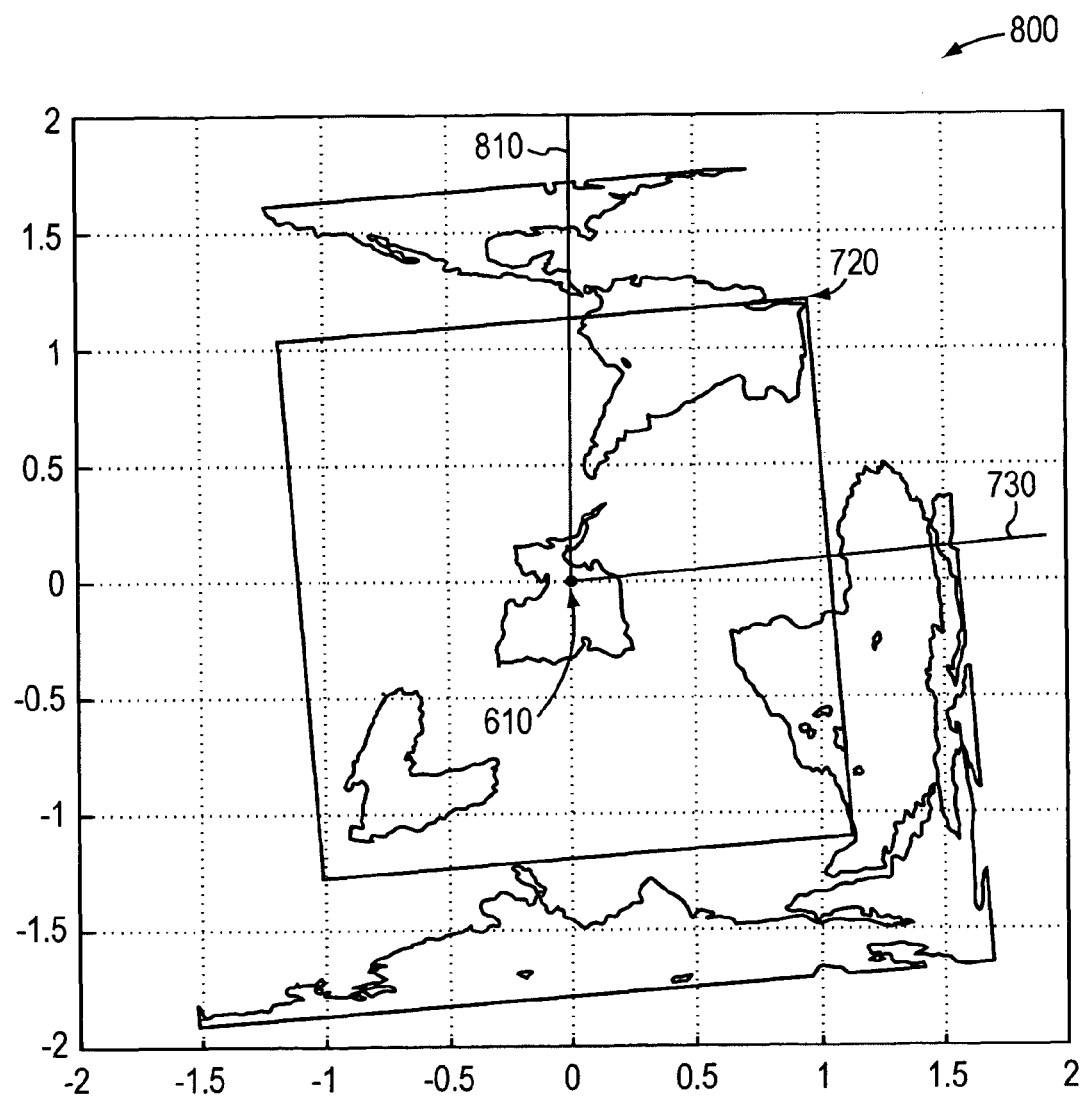
FIG. 8 illustrates an example first rotated Modified Azimuthal map projection based upon the map projection in FIG. 7.

Returning to the steps in FIG. 4A, at step 440a, the Modified Azimuthal map projection is rotated so that the lower longitude limit of the quadrangle to be trimmed to is oriented vertically, thus forming a first rotated Modified Azimuthal map projection. FIG. 8 illustrates an example first rotated Modified Azimuthal map projection 800 based upon the Modified Azimuthal map projection 700 in FIG. 7. In FIG. 8, the lower longitude limit 810 is selected to be 80° West and is shown extending upwards from the center 710. Other features of the map projection, for example the Equator 720 and Prime Meridian 730 are shown askew as a result of the rotation.

At step 445a, a polygon trimming function, for example a polygon trimming function specifically adapted to trim polygons to vertical lines, is employed to trim the polygons in the Modified Azimuthal map projection along the now vertically oriented lower longitude limit 810. The polygon trimming function operates to remove polygon data to the left-hand side of the lower longitude limit and to modify the polygon data to right-hand side of the lower longitude limit to close polygons which extend across the lower longitude limit 810, and the meridian exactly opposite on the Earth.

Figure 9:
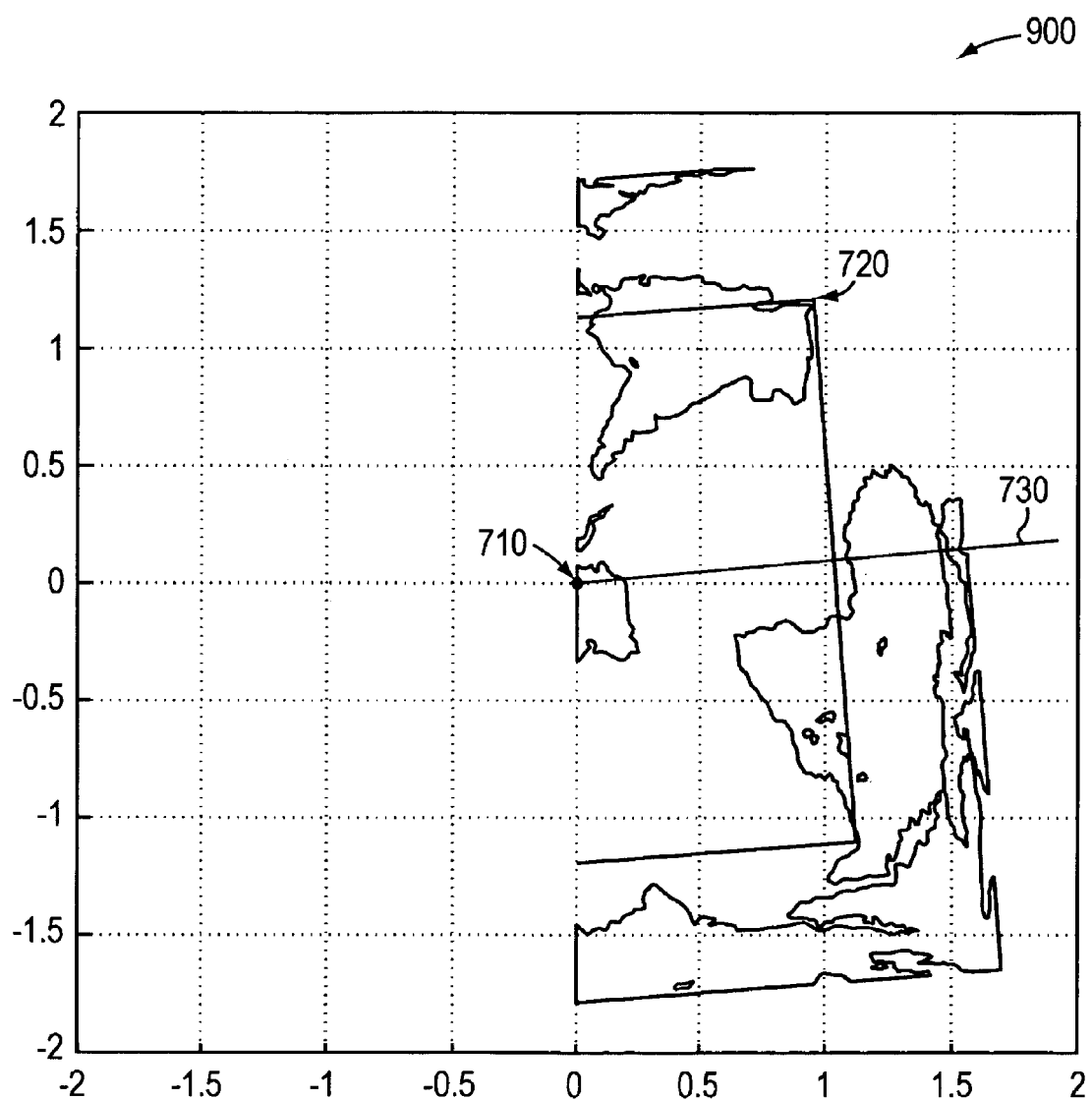
FIG. 9 illustrates an example trimmed first rotated Modified Azimuthal map projection based upon the map projection in FIG. 8.

FIG. 9 illustrates an example trimmed first rotated Modified Azimuthal map projection 900 based upon the first rotated Modified Azimuthal map projection 800 shown in FIG. 8. The trimmed first rotated Modified Azimuthal map projection 900 clearly shows the results of polygon trimming.

Figure 10:
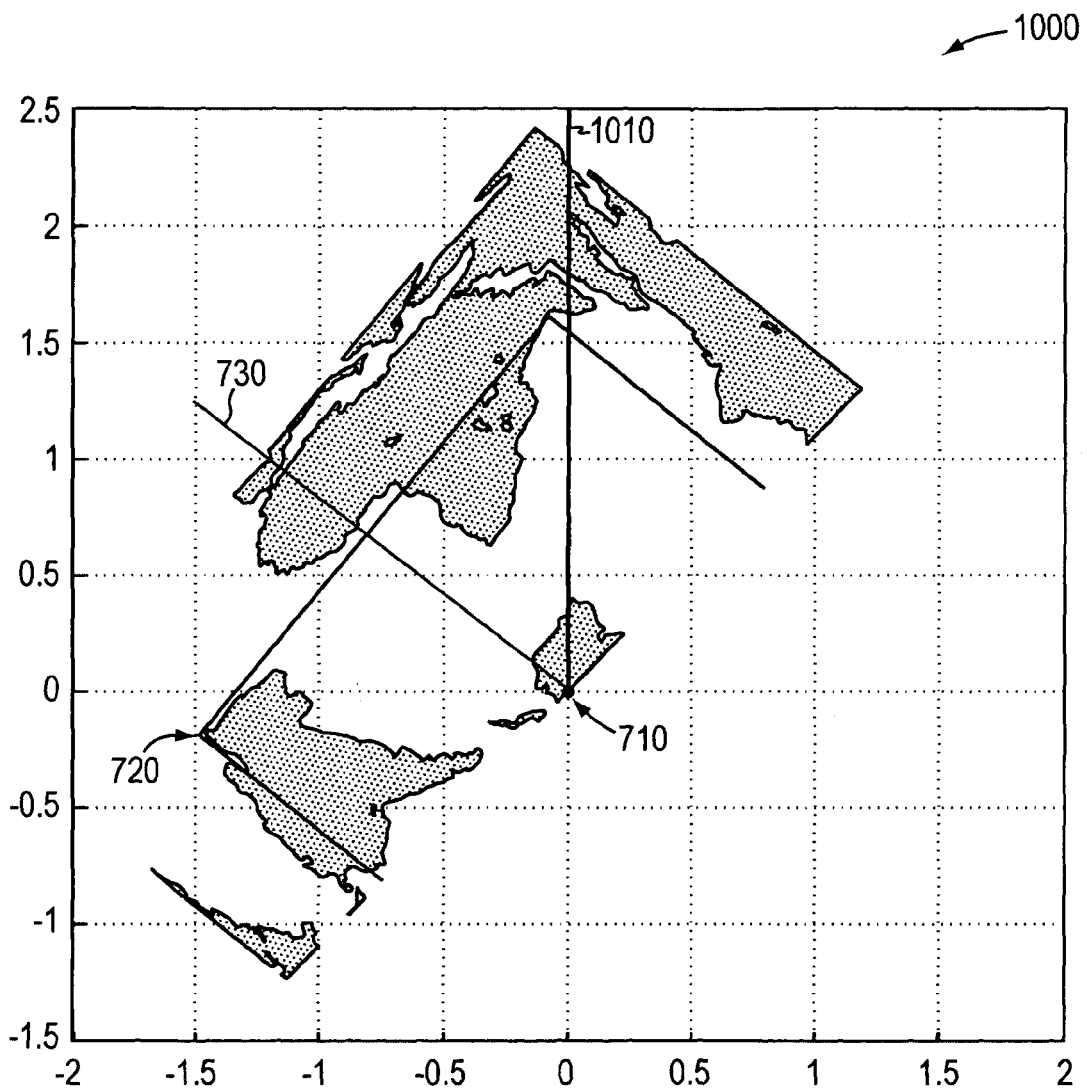
FIG. 10 illustrates an example second rotated Modified Azimuthal map projection based upon the map projection in FIG. 9.

At step 450a, the trimmed first rotated Modified Azimuthal map projection is rotated a second time, so that the upper longitude limit of the quadrangle to be trimmed to is oriented vertically, thus forming a second rotated Modified Azimuthal map projection. FIG. 10 illustrates an example second rotated Modified Azimuthal map projection 1000 based upon the map projection in FIG. 9. The upper longitude limit 1010, selected here to be 50° East, projects upwards from the center 710. Once again, the features of the map projection, including, for example the Equator 720 and Prime Meridian 730, are shown askew as a result of the second rotation.

Figure 11:
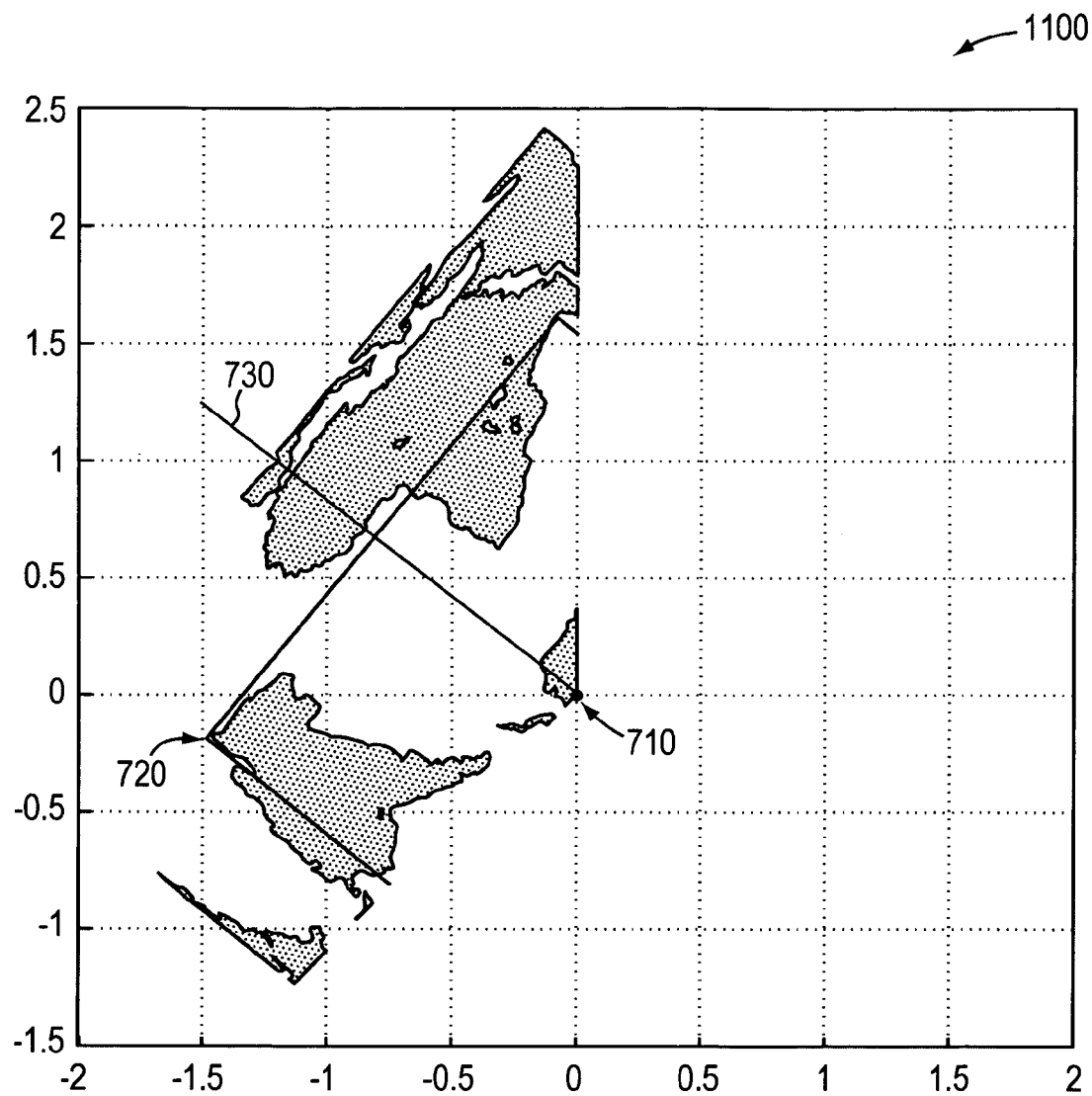
FIG. 11 illustrates an example trimmed second rotated Modified Azimuthal map projection based upon the map projection in FIG. 10.

At step 455a, a polygon trimming function, such as a polygon trimming function specifically adapted to trim polygons to vertical lines, is again employed, this time to trim polygons along the now vertically oriented upper longitude limit 1010. The polygon trimming function operates to remove polygon data to the right-hand side of the upper longitude limit, and to modify the polygon data to left-hand side of the upper longitude limit, to close polygons that extend across the limit. FIG. 11 illustrates an example trimmed second rotated Modified Azimuthal map projection 1100 based upon the map projection 1000 in FIG. 10. The trimmed second rotated Modified Azimuthal map projection 1100 clearly shows the results of polygon trimming.

Figure 12:
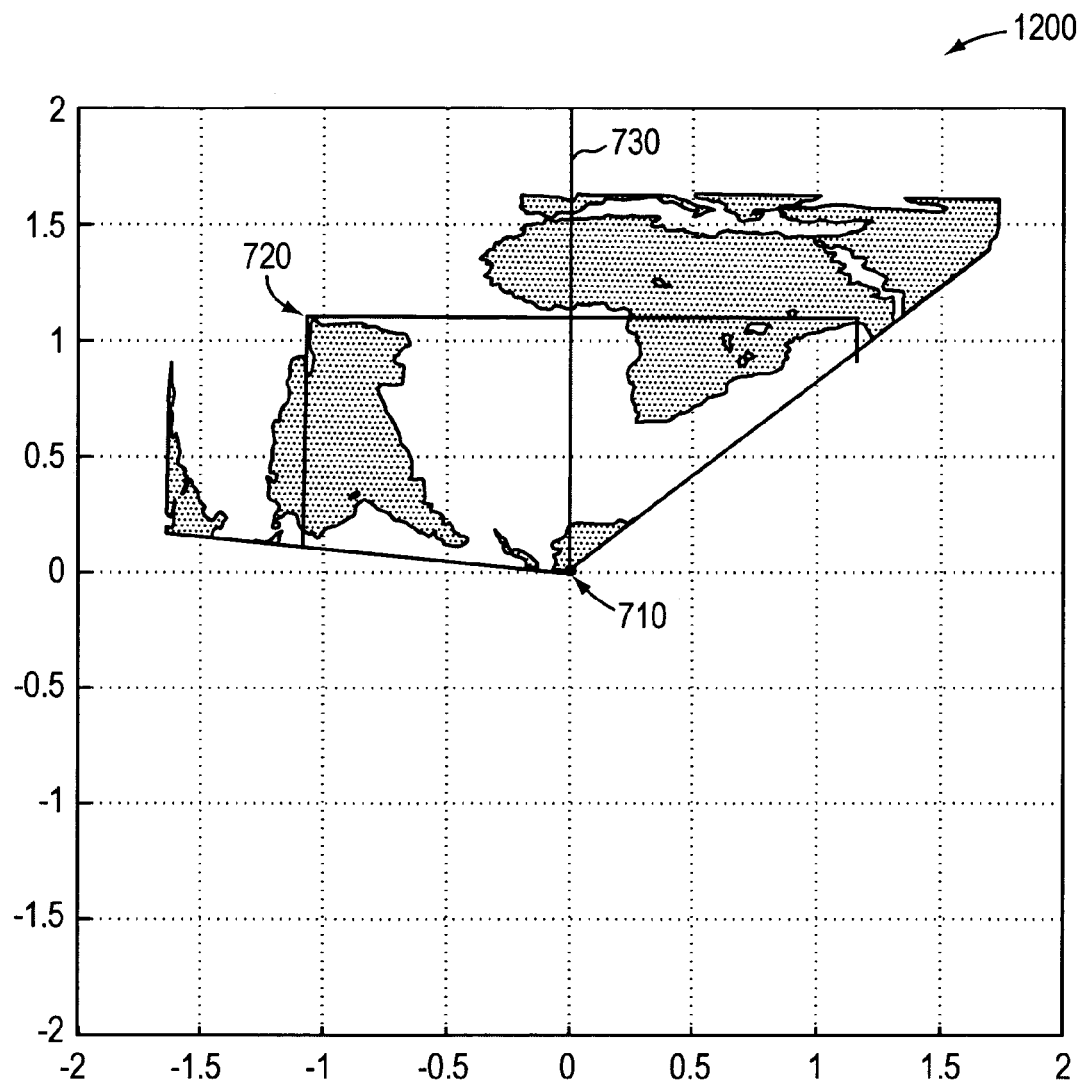
FIG. 12 illustrates an example third rotated Modified Azimuthal map projection based upon the map projection in FIG. 11.

At step 460a the trimmed second rotated Modified Azimuthal map projection is rotated a third time to form a third rotated Modified Azimuthal projection. FIG. 12 illustrates an example third rotated Modified Azimuthal projection 1200 based upon the map projection 1100 in FIG. 11. The third rotated Modified Azimuthal map projection 1200 is oriented in the same manner as the original Modified Azimuthal map projection 600, to thus undue the effects of the first and second rotations.

Figure 13:
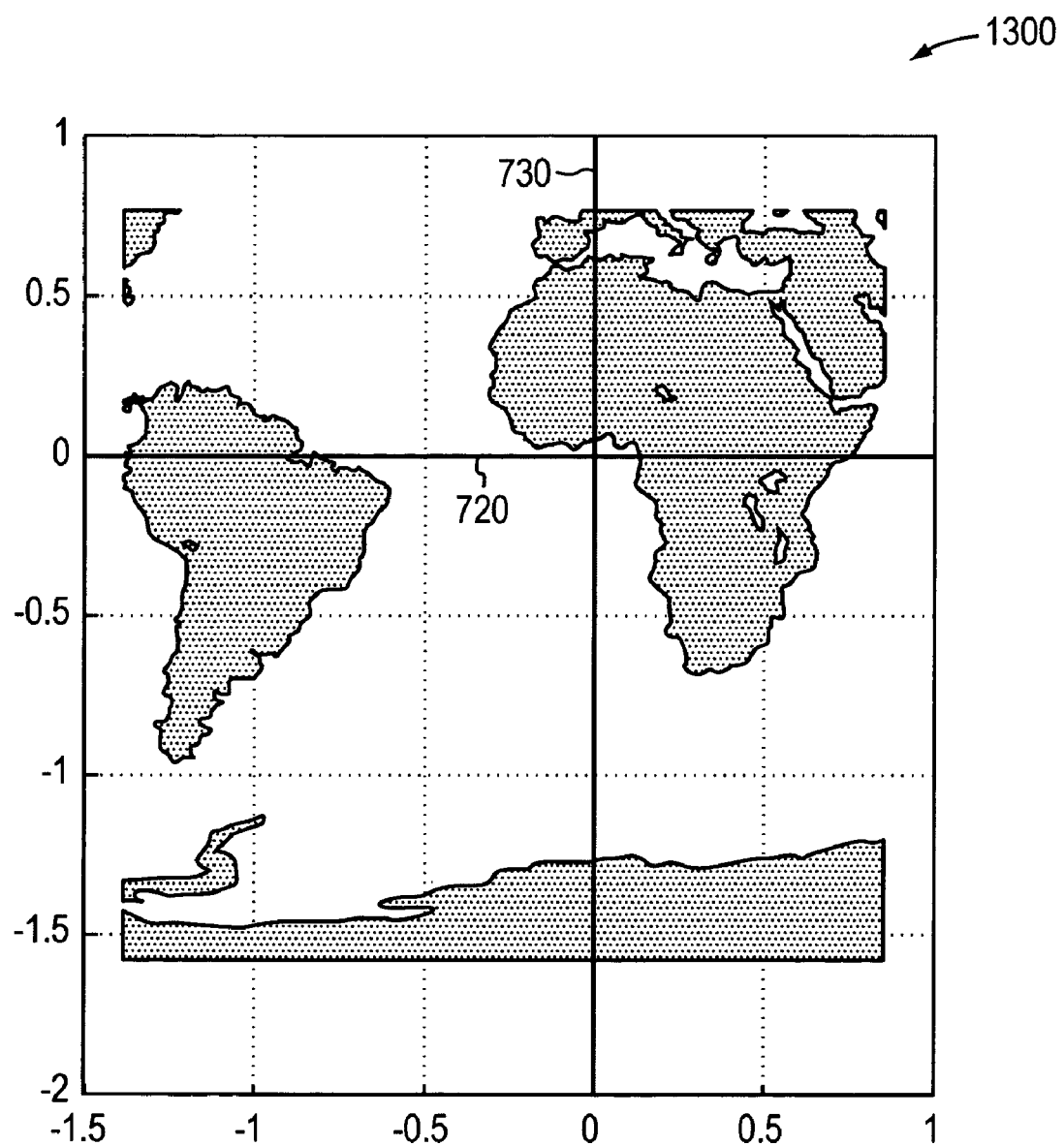
FIG. 13 is an example map generated by conversion from the map projection of FIG. 12.

At step 465a, the map coordinates of the polygons in the Modified Azimuthal map projection are converted back to a georeferenced form, i.e. back to geographic data. For example, the x and y coordinates of projected points that represent vertices of polygons are converted back to latitude and longitude values, to in effect undo the conversion to a Modified Azimuthal map projection. Specifically, assuming latitude and longitude vectors 270, 275 are used to store geographic data, a longitude vector 275 may be reconstructed by the following expression:

$$lon=atan2(x,y);$$

where "atan2" is the well-known mathematical function that calculates the arc tangent of the first argument divided by the second argument, taking into account the signs of the arguments to select a proper quadrant. Further, a latitude vector 270 may be reconstructed by the expression:

$$lat=scalefactor(lon)*hypot(x,y)-pi/2;$$

where "lat" is a vector storing latitude coordinates of polygon vertices, "scalefactor(lon)" is the adjustment factor based upon longitude described above in reference to FIG. 6, "hypot" is a mathematical function that calculates for each element of vector arguments the length of the hypotenuse of a right triangle formed from the first and second arguments, and the mathematical operators are applied element-by-element to the vectors. FIG. 13 is an example map 1300 generated by conversion from the map projection 1200 of FIG. 12.

Figure 14:
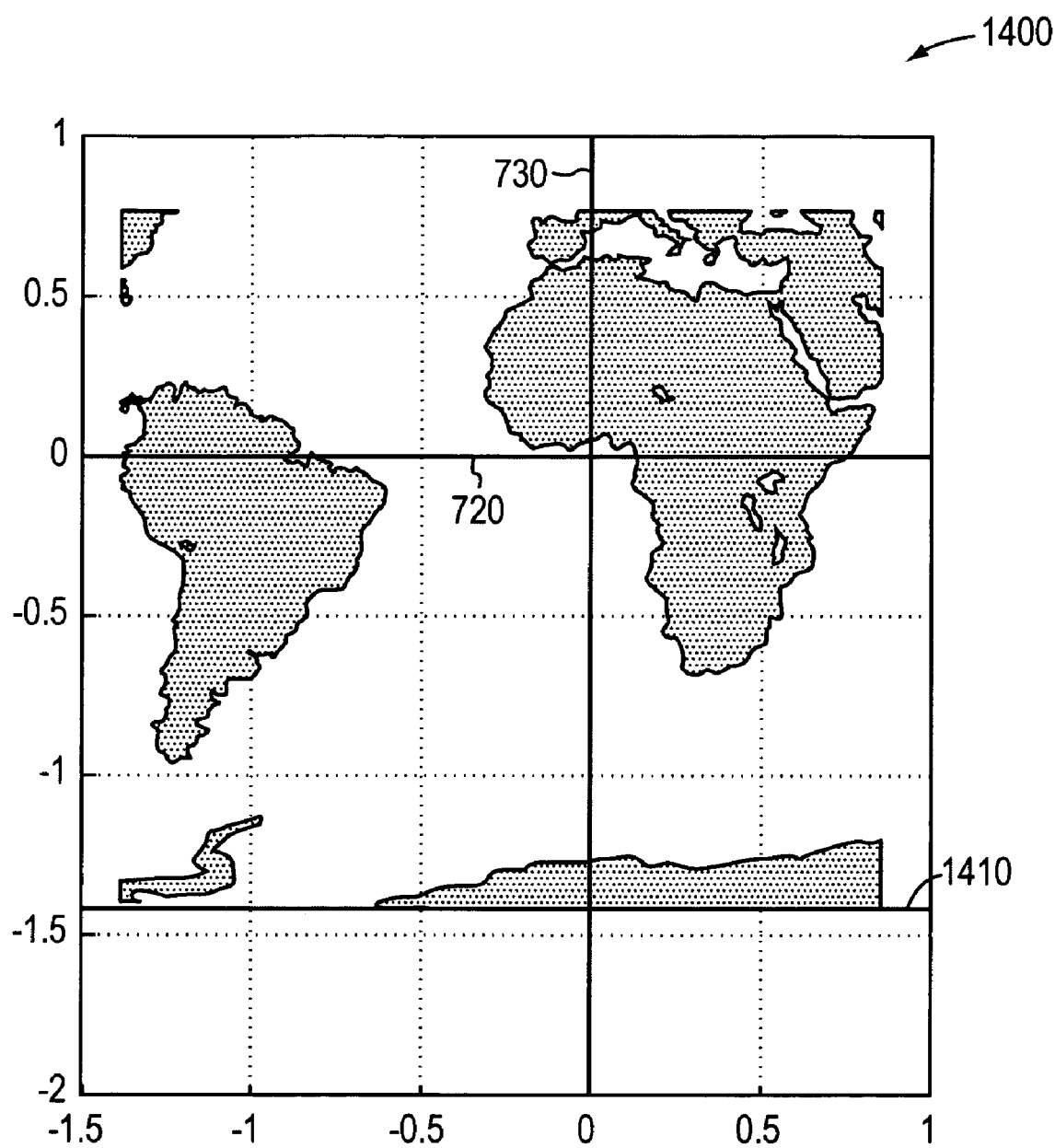
FIG. 14 is an example map generated by trimming the example map of FIG. 13 to a lower latitude limit to thus display a particular quadrangle of the map in FIG. 3.

Finally, at step 470a, the polygons in the geographic data are trimmed to the lower latitude limit. Such trimming may be accomplished using a polygon trimming technique that involves rotation of geographic data so that all trimming may take place along a vertical line. FIG. 14 is an example map 1400 generated by trimming the example map 1300 of FIG. 13 to a lower latitude limit 1410. In FIG. 14, the lower latitude limit is selected to be 78° South. Thus, with all trimming now complete the example map 1400 shows only a selected quadrangle of the map shown in FIG. 3. At step 490, the geographic data underlying the example map 1400 may be displayed, stored, or otherwise manipulated as desired.

Polygon Trimming Using a Map Projection Centered at the North Pole

Considering path 422 of FIGS. 4A and B, trimming geographic data defining polygons using a Modified Azimuthal map projection centered about the North Pole is now discussed. Many of the steps involved closely parallel the steps described above in relation to trimming using a Modified Azimuthal map projection centered about the South Pole, and the reader is referred to the above descriptions where appropriate for further details and explanations.

Following path 422, at step 430b the polygons in the geographic data are trimmed to a lower latitude limit. As above, such trimming may be accomplished using a polygon trimming technique that involves rotation the geographic data so that all trimming takes place along a vertical line.

At step 435b, the geographic data defining polygons is transformed into map coordinates in a Modified Azimuthal map projection centered at the North Pole by application of transformation expressions. Assuming the geographic data is in the form of latitude and longitude vectors 270, 275, the transformation may be achieved by application of the expressions:

$$r=(pi/2-lat)/scalefactor(lon);$$

$$x=r*sin(-lon);$$

$$y=r*cos(-lon);$$

where the mathematical operators, such as "/", "*", "+" and "−", are applied element-by-element to the vectors. In some implementations, certain adjustments to the above expressions may be made to take into account rounding of constants. For example the above expressions may be supplemented by expressions specially defining values in the x and y vectors where sine and cosine should ideally evaluate to exactly zero, but may not due to rounding of pi. Specifically expressions may provide:

if lon==pi, then x(lon)=0;

if lon==−pi, then x(lon)=0;

At step 440b, the Modified Azimuthal map projection is rotated so that the lower longitude limit of the quadrangle is oriented vertically, thus forming a first rotated Modified Azimuthal map projection.

At step 445b, a polygon trimming function, for example a polygon trimming function specifically adapted to trim polygons to vertical lines is employed to trim the polygons in the Modified Azimuthal map projection along the now vertically oriented lower longitude limit. The polygon trimming function operates to remove polygon data to the left-hand side of the lower longitude limit and to modify the polygon data to right-hand side of the lower longitude limit to close polygons that extend across the limit.

At step 450b, the trimmed first rotated Modified Azimuthal map projection is rotated a second time, so that the upper longitude limit of the quadrangle is oriented vertically, thus forming a second rotated Modified Azimuthal map projection.

At step 455b, the polygon trimming function is again employed, this time to trim polygons along the now vertically oriented upper longitude limit. The polygon trimming function operates to remove polygon data to the right-hand side of the upper longitude limit and to modify the polygon data to left-hand side of the upper longitude limit to close polygons that extend across the limit.

At step 460b the trimmed second rotated Modified Azimuthal map projection is rotated a third time to form a third rotated Modified Azimuthal projection, which is oriented in the same manner as the original Modified Azimuthal map projection, to thus undue the effects of the first and second rotations.

At step 465b, the map coordinates of the polygons in the Modified Azimuthal map projection are converted back to a geographic data. That is, the x and y coordinates of projected points that represent vertices of polygons are converted back to latitude and longitude values, to in effect undo conversion to the Modified Azimuthal Map projection. Specifically, assuming latitude and longitude vectors 270, 275 are used to store geographic data, a longitude vector 275 may be reconstructed by the following expression:

$$lon=-atan2(x,y);$$

Further, a latitude vector 270 may be reconstructed by the formula:

$$lat=pi/2-(scalefactor(lon)*hypot(x,y)).$$

Finally, at step 470b, the polygons in the geographic data are trimmed to the upper latitude limit, for example using a trimming technique that involves rotation of polygons so that all trimming may be take place along a vertical line. After such trimming, the geographic data is now trimmed to a quadrangle and may be stored, displayed, or otherwise manipulated as desired at step 490.

Polygon Trimming Using Map Projections Centered at Both Poles

Considering path 426 of FIGS. 4A and B, trimming geographic data defining polygons using two Modified Azimuthal map projections is now discussed. At step 475, the geographic data is segmented, for example along the Equator, to form a first portion and a second portion, for example a portion in the southern hemisphere and a portion in the northern hemisphere. In one embodiment, the geographic data is segmented by replicating the data and applying a polygon trimming technique to each set of replicated data, trimming away polygon data above the Equator in one set, and below the Equator in the other. Polygons that cross the Equator are appropriately trimmed along the boundary Each portion of the geographic data is then subject to trimming at the boundaries of the quadrangle that extend into the hemisphere described by the data. For example, the portion of the geographic data in the southern hemisphere is subject to polygon trimming using a Modified Azimuthal map projection centered at the South Pole, at condensed steps 480 that signifies steps similar to steps 430*a* to 470*a* described above, and the portion of the geographic data in the northern hemisphere is subject to polygon trimming using a Modified Azimuthal map projection centered at the North Pole, at condensed steps 485 that signifies steps similar to steps 430*b* to 470*b* described above. After the portions of the geographic data in the southern and northern hemispheres are trimmed, the geographic data defining polygons is joined. Such joining includes joining of individual polygons, to reconstitute polygons which span the Equator. After such joining, the geographic data is now trimmed to a quadrangle and may be stored, displayed, or otherwise manipulated as desired at step 490.

Variation on Polygon Trimming when Longitude Limits Span 180°

In some configurations, where the lower an upper longitude limits of a quadrangle span an interval of more than 180° (π radians), but less than 360° (2π radians), the above describe techniques may be adapted to trim the geographic data to two separate quadrangles, each of which spans a smaller longitude interval. For example, the quadrangle may be partitioned into a first quadrangle and a second quadrangle. The first quadrangle, may extend the 180° (π radians) in longitude, while a second quadrangle may extend the remaining portion of the longitude span. Geographic data may be trimmed to the first quadrangle using an abbreviated version of the technique described in relation to FIG. 4A and FIG. 4B, as trimming to a quadrangle that spans 180° of longitude requires only a single longitude trimming operation. The second quadrangle may be trimmed to using the full technique described in relation to FIG. 4A and FIG. 4B. Once appropriately trimmed, the geographic data corresponding to the first and second quadrangles may be joined along their common edge yielding a final result. The foregoing has been a detailed description of several embodiments of the present disclosure. Further modifications and additions may be made without departing from the disclosure's intended spirit and scope. While polygon trimming of geographic data descriptive of planets, such as the Earth, has been described above, many of the techniques described above are readily applicable to trimming of polygons that describe other types of objects, for example other types of celestial bodies, computer-created models of objects, virtual reality systems, or other items. Further, while the above described techniques were described as applicable to an example technical computing environment, the reader is reminded that such techniques may be implemented in hardware (for example in programmable logic circuits, specially-designed hardware chips, analog or partially-analog devices, and other types of devices), in other types of software (for example in other applications having computer-executable instructions stored on computer-readable media for execution on a computing device), or in a combination of hardware and software. Accordingly, it should be remembered that the above descriptions are meant to be taken only by way of example.

What is claimed is:

1. A method for trimming geographic data that defines polygons to boundaries of a quadrangle, comprising:
    converting the geographic data into map coordinates in a modified azimuthal map projection, a map coordinate in the modified azimuthal map projection describing a projected point having an azimuthal angle proportional to longitude of the point, and having a radius from the center of the modified azimuthal map projection proportional to both longitude and latitude of the point such that parallels in the modified azimuthal map projection are projected as squares, the modified azimuthal map projection being non-equidistant;
    trimming one or more polygons along a lower longitude limit of the quadrangle in the modified azimuthal map projection;
    trimming one or more polygons along an upper longitude limit of the quadrangle in the modified azimuthal map projection; and
    converting the map coordinates in the modified azimuthal map projection back to geographic data.

2. The method of claim 1, wherein the modified azimuthal map projection is a polar modified azimuthal map projection.

3. The method of claim 1, further comprising:
    determining if a lower latitude limit of the quadrangle is within a threshold distance of a first point and an upper latitude limit is not within the threshold distance of a second point, and if so, using the first point as a center of the modified azimuthal map projection.

4. The method of claim 3, further comprising:
    determining if an upper latitude limit of the quadrangle is within the threshold distance of a second point and a lower latitude limit is not within the threshold distance of the first point, and if so, using the second point as a center of the modified azimuthal map projection.

5. The method of claim 4, wherein the first point is the South Pole and the second point is the North Pole.

6. The method of claim 1, further comprising:
    determining if a lower latitude limit of the quadrangle is within a threshold distance of a first point and an upper latitude limit is within the threshold distance of a second point, and if so, segmenting the geographic data into a first portion and a second portion; and
    applying the first portion to the step of converting the geographic data into map coordinates in a modified azimuthal map projection.

7. The method of claim 1, wherein trimming polygons along a lower longitude limit further comprises:
    rotating the modified azimuthal map projection so that the lower longitude limit coincides with a vertical line; and
    trimming polygons along the vertical line to remove portions to a first side of the vertical line.

8. The method of claim 6, wherein trimming polygons along an upper longitude limit further comprises:
    rotating the modified azimuthal map projection so that the upper longitude limit coincides with the vertical line; and
    trimming polygons along the vertical line to remove portions to a second side of the vertical line.

9. The method of claim 1, wherein the geographic data comprises a latitude vector that includes latitudes of vertices of polygons, and a longitude vector that includes longitudes of vertices of polygons.

10. The method of claim 1, wherein converting the geographic data into map coordinates in a modified azimuthal map projection further comprises:
  setting an x-axis value of a projected point using calculation of sine of longitude of the point; and
  setting a y-axis value of a projected point using calculation of cosine of longitude of the point.

11. The method of claim 9, further comprising:
  multiplying sine of the longitude of the point by the sum of latitude of the point and a constant divided by an adjustment factor; and
  multiplying cosine of the longitude of the point by the sum of latitude of the point and the constant divided by the adjustment factor.

12. The method of claim 1, wherein converting the geographic data into map coordinates in a modified azimuthal map projection further comprises:
  employing the expressions, $r=(lat+pi/2)/scalefactor(lon);$ $x=r*sin(-lon);$ $y=r*cos(lon);$ where "lat" and "lon" are latitude and longitude vectors storing polygon data, "scalefactor(lon)" is an adjustment factor based upon longitude, "x" and "y" are vectors storing x-axis and y-axis values of map coordinates of polygon vertices in the modified azimuthal map projection, and "pi" is an approximation of the mathematical constant pi.

13. An apparatus for trimming geographic data that defines polygons to boundaries of a quadrangle, comprising:
  a processor configured to execute instructions for one or more units; and
  a polygon to quadrangle trimming unit configured to convert the geographic data into map coordinates in a modified azimuthal map projection, a map coordinate in the modified azimuthal map projection describing a projected point having an azimuthal angle proportional to longitude of the point, and having a radius from the center of the modified azimuthal map projection proportional to both longitude and latitude of the point such that parallels in the modified azimuthal map projection are projected as squares, wherein the modified azimuthal map projection is non-equidistant,
  wherein the polygon to quadrangle trimming unit is further configured to trim polygons along a lower and an upper longitude limit of the quadrangle in the modified azimuthal map projection, and to convert the map coordinates in the modified azimuthal map projection back to geographic data.

14. The apparatus of claim 13, wherein the modified azimuthal map projection is a polar modified azimuthal map projection.

15. The apparatus of claim 13, wherein the polygon to quadrangle trimming unit further comprises:
  a decision unit configured to determine if a lower latitude limit of the quadrangle is within a threshold distance of a first point and if an upper latitude limit is not within the threshold distance of a second point, and if so, to cause the polygon to quadrangle trimming unit to use the first point as a center of the modified azimuthal map projection.

16. The apparatus of claim 15, wherein the decision unit is further configured to determine if an upper latitude limit of the quadrangle is within a threshold distance of a second point and a lower latitude limit is not within the threshold distance of the first point, and if so, to cause the polygon to quadrangle trimming unit to use the second point as a center of the modified azimuthal map projection.

17. The apparatus of claim 16, wherein the first point is the South Pole and the second point is the North Pole.

18. The apparatus of claim 13, wherein the polygon to quadrangle trimming unit further comprises:
  a decision unit configured to determine if a lower latitude limit of the quadrangle is within a threshold distance of a first point and an upper latitude limit is within the threshold distance of a second point, and if so, to cause the polygon to quadrangle trimming unit to segment the geographic data into a first portion and a second portion, and to convert the first portion into map coordinates in the modified azimuthal map projection.

19. The apparatus of claim 13, wherein the polygon to quadrangle trimming unit is further configured to rotate the modified azimuthal map projection so that the lower longitude limit coincides with a vertical line and to trim polygons along the vertical line to remove portions to a first side of the vertical line.

20. The apparatus of claim 19, wherein the polygon to quadrangle trimming unit is further configured to rotate the modified azimuthal map projection so that the upper longitude limit coincides with the vertical line, and to trim polygons along the vertical line to remove portions to a second side of the vertical line.

21. The apparatus of claim 13, wherein the geographic data comprises a latitude vector that includes latitudes of vertices of polygons, and a longitude vector that includes longitudes of vertices of polygons.

22. The apparatus of claim 13 wherein the polygon to quadrangle trimming unit is further configured to set an x-axis value of a projected point using calculation of sine of longitude of the point, and to set a y-axis value of a projected point using calculation of cosine of longitude of the point.

23. The apparatus of 22, wherein the polygon to quadrangle trimming unit is further configured to multiply sine of the longitude of the point by the sum of latitude of the point and a constant, divided by an adjustment factor, and multiply cosine of the longitude of the point by the sum of latitude of the point and the constant, divided by the adjustment factor.

24. The apparatus of 13, wherein the polygon to quadrangle trimming unit is further configured to employ the expressions, $r=(lat+pi/2)/scalefactor(lon);$ $x=r*sin(-lon);$ $y=r*cos(lon);$ where "lat" and "lon" are latitude and longitude vectors storing polygon data, "scalefactor(lon)" is an adjustment factor based upon longitude, "x" and "y" are vectors storing x-axis and y-axis values of map coordinates of polygon vertices in the modified azimuthal map projection, and "pi" is an approximation of the mathematical constant pi.

25. An apparatus for trimming geographic data to boundaries of a quadrangle, comprising:
  means for converting the geographic data into map coordinates in a modified azimuthal map projection, a map coordinate in the modified azimuthal map projection to describe a projected point having an azimuthal angle proportional to longitude of the point, and having a radius from the center of the modified azimuthal map projection proportional to both longitude and latitude of the point such that parallels in the modified azimuthal map projection are projected as squares, wherein the modified azimuthal map projection is non-equidistant;

means for trimming one or more polygons along a lower longitude limit of the quadrangle in the modified azimuthal map projection;

means for trimming the one or more polygons along an upper longitude limit of the quadrangle in the modified azimuthal map projection; and means for converting the map coordinates in the modified azimuthal map projection back to geographic data.

26. A non-transitory, tangible computer-readable media comprising program instructions that, when executed, are operable to:

convert geographic data into map coordinates in a modified azimuthal map projection, a map coordinate in the modified azimuthal map projection to describe a projected point having an azimuthal angle proportional to longitude of the point, and having a radius from the center of the modified azimuthal map projection proportional to both longitude and latitude of the point such that parallels in the modified azimuthal map projection are projected as squares, wherein the modified azimuthal map projection is non-equidistant;

trim one or more polygons along a lower longitude limit of the quadrangle in the modified azimuthal map projection;

trim one or more polygons along an upper longitude limit of the quadrangle in the modified azimuthal map projection; and convert the map coordinates in the modified azimuthal map projection back to geographic data.

27. The computer-readable media of claim 26, wherein the modified azimuthal map projection is a polar modified azimuthal map projection.

28. The computer-readable media of claim 26, further comprising program instructions that, when executed, are operable to:

determine if a lower latitude limit of the quadrangle is within a threshold distance of a first point and an upper latitude limit is not within the threshold distance of a second point, and if so, use the first point as a center of the modified azimuthal map projection.

29. The computer-readable media of claim 28, wherein the first point is the South Pole.

30. The computer-readable media of claim 26, wherein the geographic data comprises a latitude vector that includes latitudes of vertices of polygons, and a longitude vector that includes longitudes of vertices of polygons.

31. The computer-readable media of claim 26, further comprising program instructions that, when executed, are operable to:

set an x-axis value of a projected point using calculation of sine of longitude of the point; and set a y-axis value of a projected point using calculation of cosine of longitude of the point.

32. The computer-readable media of claim 26, further comprising program instructions that, when executed, are operable to:

multiply sine of the longitude of the point by the sum of latitude of the point and a constant divided by an adjustment factor; and multiply cosine of the longitude of the point by the sum of latitude of the point and the constant divided by the adjustment factor.

33. The computer-readable media of claim 26, further comprising program instructions that, when executed, are operable to:

employ the expressions, $r=(lat+pi/2)/scalefactor(lon);$ $x=r*sin(-lon);$ $y=r*cos(lon);$ where "lat" and "lon" are latitude and longitude vectors storing polygon data, "scalefactor(lon)" is an adjustment factor based upon longitude, "x" and "y" are vectors storing x-axis and y-axis values of map coordinates of polygon vertices in the modified azimuthal map projection, and "pi" is an approximation of the mathematical constant pi.

* * * * *